United States Patent
Yang et al.

(10) Patent No.: US 10,547,353 B2
(45) Date of Patent: Jan. 28, 2020

(54) DISTRIBUTED ANTENNA SYSTEM AND SIGNAL TRANSMISSION METHOD

(71) Applicant: HUAWEI TECHNOLOGIES CO., LTD., Shenzhen (CN)

(72) Inventors: Jianjun Yang, Shenzhen (CN); Ke Sun, Chengdu (CN); Sunjie Wang, Chengdu (CN); Bo Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 27 days.

(21) Appl. No.: 15/839,009

(22) Filed: Dec. 12, 2017

(65) Prior Publication Data

US 2018/0102815 A1 Apr. 12, 2018

Related U.S. Application Data

(63) Continuation of application No. PCT/CN2016/081584, filed on May 10, 2016.

(30) Foreign Application Priority Data

Jun. 29, 2015 (CN) .......................... 2015 1 0368765

(51) Int. Cl.
H04W 88/08 (2009.01)
H04B 7/022 (2017.01)
(Continued)

(52) U.S. Cl.
CPC .......... H04B 7/022 (2013.01); H04B 7/0491 (2013.01); H04W 16/20 (2013.01); H04W 88/085 (2013.01)

(58) Field of Classification Search
CPC ........ H04B 7/022; H04B 7/04; H04B 7/0491; H04W 16/20; H04W 88/085
See application file for complete search history.

(56) References Cited

U.S. PATENT DOCUMENTS

2003/0087623 A1 5/2003 Solbach
2007/0071078 A1 3/2007 Yoshida et al.
2016/0359523 A1* 12/2016 Bennett .................. H04B 5/005

FOREIGN PATENT DOCUMENTS

CN 101426210 A 5/2009
CN 103906079 A 7/2014
(Continued)

Primary Examiner — Kent Krueger
(74) Attorney, Agent, or Firm — Leydig, Voit & Mayer, Ltd.

(57) ABSTRACT

The present disclosure discloses a distributed antenna system. The DAS includes a signal source, a first signal generator, a first passive mixer, and a first antenna. The first signal generator is configured to: generate a first local-frequency signal, and send it to the first passive mixer by using a passive DAS line. The first passive mixer is configured to receive the first local-frequency signal, and a downlink radio frequency signal having a second radio frequency band. The first passive mixer is further configured to: perform frequency mixing processing on the received downlink radio frequency signal having the second radio frequency band by using the first local-frequency signal, to form a first downlink radio frequency signal having a first radio frequency band, and then send it to the first antenna. The first antenna is configured to transmit the received first downlink radio frequency signal having the first radio frequency band.

5 Claims, 8 Drawing Sheets

(51) Int. Cl.
*H04W 16/20* (2009.01)
*H04B 7/0491* (2017.01)

(56) References Cited

FOREIGN PATENT DOCUMENTS

| | | |
|---|---|---|
| CN | 104640121 A | 5/2015 |
| JP | 2007096762 A | 4/2007 |
| JP | 2014138197 A | 7/2014 |
| WO | 2015070782 A1 | 5/2015 |

* cited by examiner

DISTRIBUTED ANTENNA SYSTEM AND SIGNAL TRANSMISSION METHOD

CROSS-REFERENCE TO RELATED APPLICATIONS

This application is a continuation of International Application No. PCT/CN2016/081584, filed on May 10, 2016, which claims priority to Chinese Patent Application No. 201510368765.5, filed on Jun. 29, 2015. The disclosures of the aforementioned applications are hereby incorporated by reference in their entireties.

TECHNICAL FIELD

The present disclosure relates to the field of communications technologies, and in particular, to a distributed antenna system and a signal transmission method.

BACKGROUND

To resolve the indoor coverage problem, currently a distributed antenna system (DAS) is distributed inside a building such as a shopping mall, a cinema, a stadium, or a large enterprise workplace in most cities. With a continuous increase in a total volume of indoor services, many operators urgently need to expand a capacity of a DAS system.

SUMMARY

A transmission architecture of a DAS is provided in the present disclosure, and a distributed antenna system and a signal transmission method are provided.

According to a first aspect, an example of the present disclosure provides a distributed antenna system DAS. The DAS may include a near-end signal generation device, a passive DAS line, and a far-end transmission device, wherein the near-end signal generation device comprises a signal source and a first signal generator, and the far-end transmission device comprises a first passive mixer and a first antenna.

The first signal generator may be configured to: generate a first local-frequency signal, and send the first local-frequency signal to the first passive mixer by using the passive DAS line; the first passive mixer may be configured to receive the first local-frequency signal and a downlink radio frequency signal having a second radio frequency band; the first passive mixer is further configured to: perform frequency mixing processing on the received downlink radio frequency signal having the second radio frequency band by using the first local-frequency signal to form a first downlink radio frequency signal having a first radio frequency band, and send the first downlink radio frequency signal having the first radio frequency band to the first antenna; and the first antenna may be configured to: transmit the received first downlink radio frequency signal having the first radio frequency band.

According to a second aspect, an example of the present disclosure provides a distributed antenna system DAS. The DAS may include a near-end signal receiving device, a passive DAS line, and a far-end receiving device, wherein the near-end signal receiving device comprises a signal destination, a first signal generator, and a first mixer, and the far-end receiving device comprises a first passive mixer and a first antenna.

The first signal generator may be configured to: generate a first local-frequency signal, and send the first local-frequency signal to the first passive mixer by using the passive DAS line; the first antenna may be configured to: receive a first uplink radio frequency signal having a first radio frequency band, and send the first uplink radio frequency signal having the first radio frequency band to the first passive mixer; the first passive mixer may be configured to: receive the first local-frequency signal, perform frequency mixing processing on the first uplink radio frequency signal having the first radio frequency band by using the received first local-frequency signal, to form an uplink radio frequency signal having a second radio frequency band, and send the uplink radio frequency signal having the second radio frequency band to the first mixer by using the passive DAS line; the first mixer may be configured to: receive the uplink radio frequency signal having the second radio frequency band.

The first mixer may further be configured to: perform frequency mixing processing on the received uplink radio frequency signal having the second radio frequency band by using the first local-frequency signal generated by the first signal generator, to form the first uplink radio frequency signal having the first radio frequency band, and send the first uplink radio frequency signal having the first radio frequency band to the signal destination; or perform frequency mixing processing on the received uplink radio frequency signal having the second radio frequency band by using a local-frequency signal generated by the first mixer, to form the first uplink radio frequency signal having the first radio frequency band, and send the first uplink radio frequency signal having the first radio frequency band to the signal destination.

According to a third aspect, an example of the present disclosure provides a signal transmission method. The method may include: generating, by a first signal generator of a near-end signal generation device in a distributed antenna system (DAS), a first local-frequency signal, and sending the first local-frequency signal to a first passive mixer of a far-end transmission device in the DAS by using a passive DAS line of the DAS; receiving, by the first passive mixer, the first local-frequency signal, and a downlink radio frequency signal having a second radio frequency band; performing, by the first passive mixer, frequency mixing processing on the received downlink radio frequency signal having the second radio frequency band by using the first local-frequency signal, to form a first downlink radio frequency signal having a first radio frequency band, and sending the first downlink radio frequency signal having the first radio frequency band to a first antenna of the far-end transmission device; and transmitting, by the first antenna, the received first downlink radio frequency signal having the first radio frequency band.

It should be understood that both the foregoing general description and the following detailed descriptions are only exemplary and explanatory and are not restrictive of the disclosure.

BRIEF DESCRIPTION OF DRAWINGS

To describe the technical solutions in the examples of the present disclosure, the following briefly describes the accompanying drawings required for describing the examples. Apparently, the accompanying drawings in the following description show merely some examples of the present disclosure, and a person of ordinary skill in the art may still derive other drawings from these accompanying drawings without creative efforts.

DETAILED DESCRIPTION

The following clearly describes the technical solutions in the examples of the present disclosure with reference to the accompanying drawings in the examples of the present disclosure. Apparently, the described examples are merely some but not all of the examples of the present disclosure. All other examples obtained by a person of ordinary skill in the art based on the examples of the present disclosure without creative efforts shall fall within the protection scope of the present disclosure.

A system capacity of a distributed antenna system (DAS) may be increased by transmitting double or multiple signals in the DAS system. For example, frequency conversion processing is performed at a near end on multiple signals sent by a base station, to form signals having different frequency bands for transmission to far-end antennas by using a DAS line. Demodulation processing is performed at the far-end antennas on these signals having different frequency bands, and the signals are transmitted by using multiple antennas. In this way, multiple signals are transmitted, thereby expanding the capacity of the DAS system.

Figure 1:
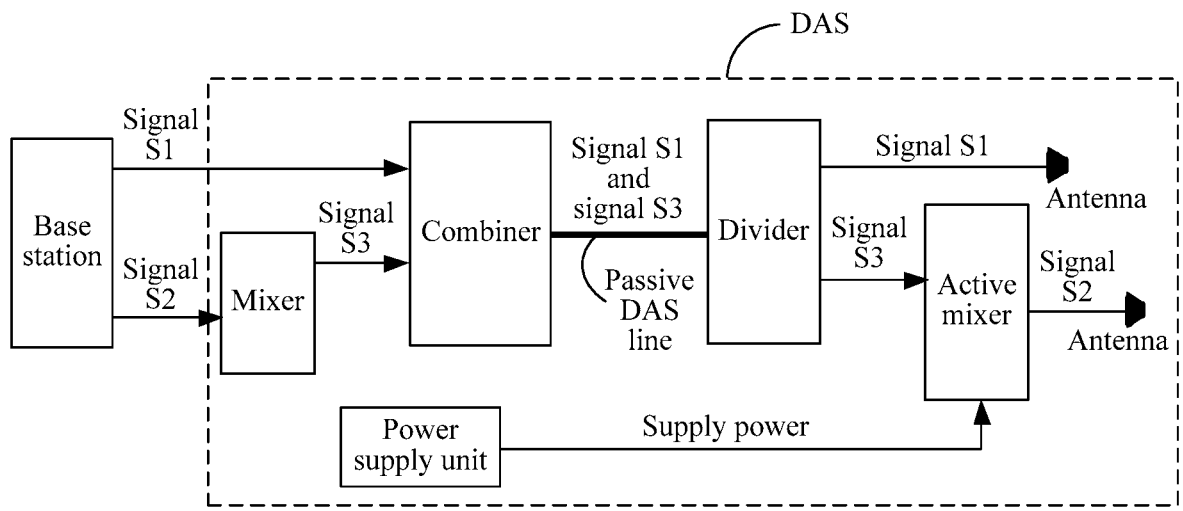
FIG. 1 is a structural diagram of a distributed antenna system (DAS)

For example, FIG. 1 is a schematic diagram of a DAS in which two signals are transmitted. As shown in FIG. 1, a mixer and a divider/combiner are provided at a near end. The mixer is used to perform frequency mixing processing on an original signal, to form a signal S2 different from the original signal S1, and the signal S2 is then transmitted to the divider/combiner. The divider/combiner combines another original signal and the signal generated after frequency mixing and then transmits a combined signal to a far end by using a DAS line. A divider/combiner, an active mixer, and multiple antennas are provided at the far end. After receiving the signal sent by the DAS, the divider/combiner obtains, by means of filtering, the original signal S1 and the signal S2 that is obtained after frequency conversion, transmits the original signal by using an antenna, and sends the signal S2 to the active mixer. The active mixer processes the signal S2 to restore to the original signal S1, and transmits the original signal S1 by using another antenna. In this way, double-stream transmission is implemented to increase a system capacity.

However, in the DAS system, the mixer provided at the far end is usually an active mixer. The active mixer needs to be powered by using a power supply unit at the near end (as shown in FIG. 1). However, an electrical signal cannot be transmitted on the DAS line in the DAS. Therefore, to transmit an electrical signal, devices on the DAS line need to be adapted (for example, replaced with active devices) or a cable needs to be laid again, so that the power supply device supplies power to the active mixer. However, all passive devices on the DAS line are deployed at special positions such as an indoor ceiling, and the power supply unit is located in an equipment room and is relatively far from the active mixer. Therefore, the manner of adapting the devices on the DAS line (for example, replacing the devices with active devices) or laying a cable may result in problems of high construction difficulty and high costs.

In the present disclosure, a passive mixer is provided at an antenna at a far end, and frequency mixing processing is performed by using a local-frequency signal transferred to the passive mixer by another device. That is, the passive mixer does not need to generate a local-frequency signal and does not need power to be supplied to the passive mixer, thereby avoiding a problem of inconvenient construction caused by an active mixer at a far end needing to be powered by using a near end when the active mixer generates a local-frequency signal. A distributed antenna system and a signal transmission method provided in the examples of the present disclosure are described below.

Figure 2:
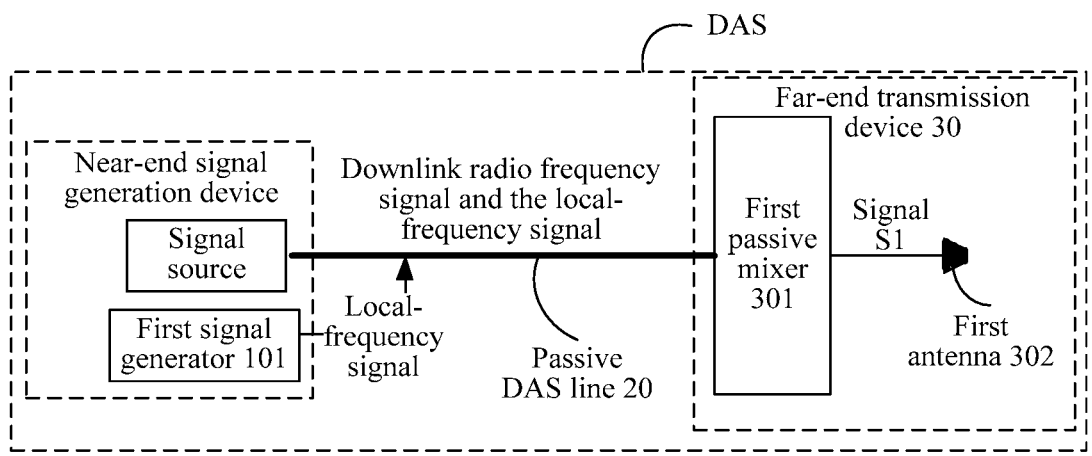
FIG. 2 is a structural diagram of a DAS according to an example of the present disclosure.

FIG. 2 is a structural diagram of a DAS according to an example of the present disclosure. As shown in FIG. 2, the DAS may include: a near-end signal generation device 10, a passive DAS line 20, and a far-end transmission device 30. The near-end signal generation device 10 is located at an input end of the passive DAS line 20. The far-end transmission device 30 is located at an output end of the passive DAS line 20. It should be noted that, the input end and the output end in this example of the present disclosure are determined relative to a transmission direction of a downlink radio frequency signal, and specific positions of the devices are not limited.

The near-end signal generation device 10 is configured to generate a signal, is located in an equipment room, and may include any device that generates a signal and a device that performs processing such as frequency mixing or combination on generated signals. The near-end signal generation device 10 may include a signal source and a first signal generator 101. The signal source may be any device that generates a signal, for example, a device such as a macro base station, a micro base station, a repeater, a remote radio unit (remote radio unit, RRU), a pico base station, or a pico RRU.

The passive DAS line 20 is configured to transmit the signal generated at the near end to an indoor antenna, and send the signal to a user by using the indoor antenna. The passive DAS line 20 may be a line including devices such as a coupler and a power splitter.

The far-end transmission device 30 is configured to transmit a signal, is located at a position such as an indoor ceiling, and may include a first passive mixer 301 and a first antenna 302. An input end of the first antenna 302 is connected to an output end of the first passive mixer 301.

The first signal generator 101 is configured to: generate a first local-frequency signal, and send the first local-frequency signal to the first passive mixer 301.

The first passive mixer 301 is configured to receive the first local-frequency signal, and a downlink radio frequency signal having a second radio frequency band.

The downlink radio frequency signal having the second radio frequency band is a signal that is generated after frequency mixing is performed on the first local-frequency signal and a first downlink radio frequency signal having a first radio frequency band that is sent by the signal source. The first radio frequency band and the second radio frequency band do not overlap with each other.

The first passive mixer 301 is further configured to: perform frequency mixing processing on the received downlink radio frequency signal having the second radio frequency band by using the first local-frequency signal, to form the first downlink radio frequency signal having the first radio frequency band, and then send the first downlink radio frequency signal having the first radio frequency band to the first antenna 302.

The frequency mixing processing may be up-conversion processing, or may be down-conversion processing. The up-conversion processing may be: adding a frequency band of the first local-frequency signal and the second radio frequency band, to move the frequency band of the downlink radio frequency signal to the first radio frequency band higher than the second radio frequency band. The down-conversion processing may be: subtracting the frequency band of the first local-frequency signal from the second radio frequency band, to move the frequency band of the downlink radio frequency signal to the first radio frequency band lower than the second radio frequency band.

For example, if the first radio frequency band is F1=[1.850-1.860] GHz, and the second radio frequency band is F2=[0.850-0.860] GHz, the first passive mixer 301 may up-convert the signal having the second radio frequency band F2=[0.850-0.860] GHz to the frequency band F1=[1.850-1.860] GHz by using the first local-frequency signal F=1 GHz.

If the first radio frequency band is F1=[1.850-1.860] GHz, and the second radio frequency band is F2=[2.050-2.060] GHz, the first passive mixer 301 may down-convert the signal having the second radio frequency band F2=[2.050-2.060] GHz to the frequency band F1=[1.850-1.860] GHz by using the first local-frequency signal F=0.200 GHz.

The first antenna 302 is configured to transmit the received first downlink radio frequency signal having the first radio frequency band.

Figure 3:
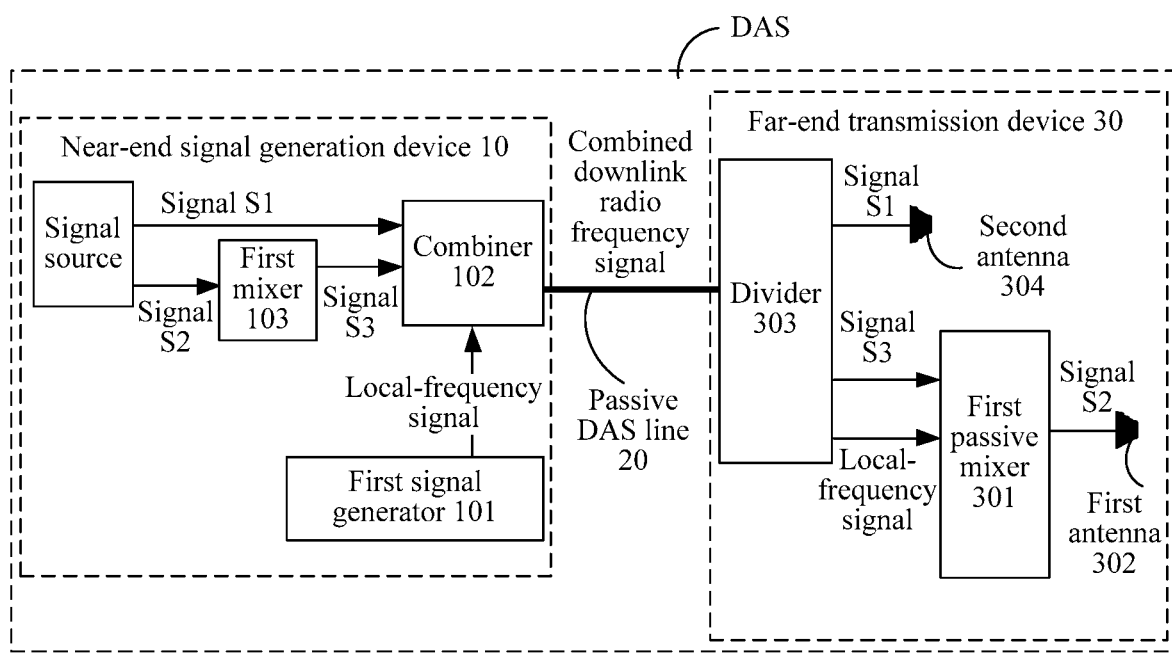
FIG. 3 is a structural diagram of another DAS according to an example of the present disclosure.

Optionally, in this example of the present disclosure, the downlink radio frequency signal obtained after frequency mixing processing at the near end and the local-frequency signal may be combined together and transmitted to the first passive mixer 301 by using the passive DAS line. Specifically, as shown in FIG. 3, the near-end signal generation device 10 may include a combiner 102 and a first mixer 103, and the far-end transmission device 30 further includes a divider 303.

The first signal generator 101 is specifically configured to send the first local-frequency signal to the combiner 102. After combination processing by the combiner 102, a combined signal is sent to the first passive mixer 301 by using the passive DAS line 20.

The first mixer 103 is configured to receive the first downlink radio frequency signal having the first radio frequency band that is sent by the signal source.

The first mixer 103 may be a passive mixer, or may be an active mixer. When the first mixer 103 is a passive mixer, the first mixer 103 may be further configured to: perform frequency mixing processing on the first downlink radio frequency signal by using the first local-frequency signal generated by the first signal generator, and send, to the combiner, the downlink radio frequency signal having the second radio frequency band that is generated after frequency mixing.

When the first mixer 103 is an active mixer, the first mixer 103 may further perform frequency mixing processing on the first downlink radio frequency signal by using a local-frequency signal generated by the first mixer, and send, to the combiner, the downlink radio frequency signal having the second radio frequency band that is generated after frequency mixing.

It should be noted that, when the first mixer 103 is an active mixer, because the first mixer 103 can generate a local-frequency signal, in this example of the present disclosure, the first mixer 103 in the near-end signal generation device may also generate a local-frequency signal, and send the local-frequency signal to the first passive mixer 301. That is, the first passive mixer 301 may further be configured to receive the local-frequency signal generated by the first mixer 103. For the first passive mixer 301, a function of the local-frequency signal is the same as that of the first local-frequency signal.

Optionally, the downlink radio frequency signal having the second radio frequency band may be a signal that is relatively suitable for transmission by using the passive DAS line. That is, an attenuation of the converted downlink radio frequency signal having the second radio frequency band that is caused when the converted downlink radio frequency signal is transmitted by using the passive DAS line is less than an attenuation of the first downlink radio frequency signal that is caused when the first downlink radio frequency signal is transmitted by using the passive DAS line, so that an attenuation during signal transmission is reduced, and a signal transmission distance is increased. For example, S2 is a high frequency signal, and S3 is a converted signal that is more suitable for transmission by using the passive DAS line.

The combiner 102 is configured to: receive the downlink radio frequency signal having the second radio frequency band and the first local-frequency signal, combine the received downlink radio frequency signal having the second radio frequency band and the received first local-frequency signal, to form a combined downlink radio frequency signal, and then send the combined downlink radio frequency signal to the divider by using the passive DAS line.

The divider 303 is configured to: receive the combined downlink radio frequency signal, separate the signals included in the received combined downlink radio frequency signal, to obtain the downlink radio frequency signal having the second radio frequency band and the first local-frequency signal, and then send the downlink radio frequency signal having the second radio frequency band and the first local-frequency signal to the first passive mixer.

The first passive mixer 301 receives the first local-frequency signal and the downlink radio frequency signal having the second radio frequency band. Specifically, the first passive mixer 301 receives the first local-frequency signal and the downlink radio frequency signal having the second radio frequency band that are sent by the divider.

Further, the DAS provided in this example of the present disclosure may further support same-frequency-band double-stream transmission, to expand a capacity of the DAS system. For example, a downlink radio frequency signal and a converted downlink radio frequency signal may be combined together for transmission. Specifically, as shown in FIG. 3, the far-end transmission device 30 further includes a second antenna 304.

The combiner 102 is further configured to: receive a second downlink radio frequency signal having the first radio frequency band that is sent by the signal source, combine the second downlink radio frequency signal into the combined downlink radio frequency signal, and send a downlink radio frequency signal obtained after combination to the divider.

The second downlink radio frequency signal may be a signal that is formed by combining the first downlink radio frequency signal and the original signals in the combined downlink radio frequency signal together.

The divider 303 is further configured to: obtain the second downlink radio frequency signal having the first radio frequency band, and then send the second downlink radio frequency signal having the first radio frequency band to the second antenna.

The second antenna 304 is configured to transmit the received second downlink radio frequency signal having the first radio frequency band.

In this way, two signals having a same frequency band are transmitted by using the DAS system. Compared with other DAS systems supporting only single-stream transmission, a system capacity is increased.

Figure 4:
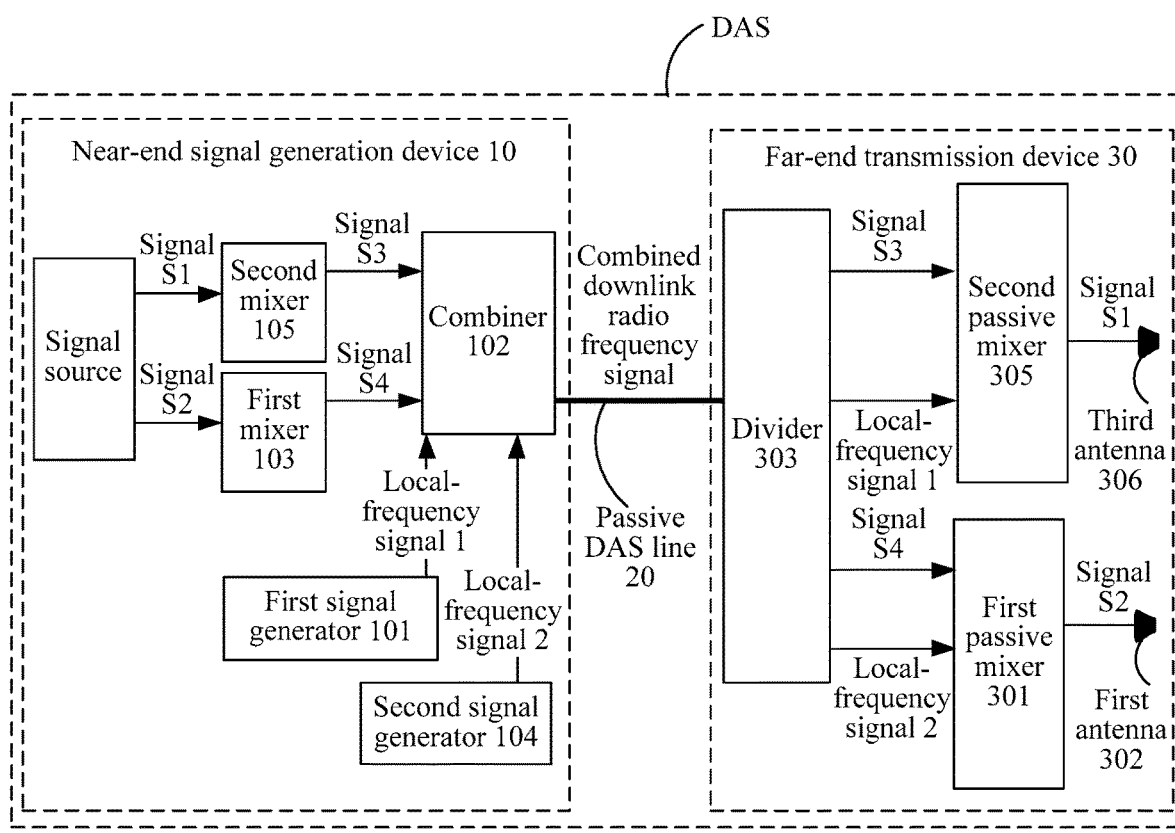
FIG. 4 is a structural diagram of another DAS according to an example of the present disclosure.

Further, to better improve the transmission capacity of the DAS system, the DAS provided in this example of the present disclosure may further support transmission of multiple signals having a same radio frequency band. For example, after frequency mixing processing is separately performed on at least two downlink radio frequency signals having a same frequency band, signals having different frequency bands are formed and then combined together and sent to the far end. After the multiple radio frequency signals are obtained at the far end according to the combined signal, the multiple radio frequency signals are transmitted by using multiple antennas. Specifically, as shown in FIG. 4, the near-end signal generation device 10 may further include a second signal generator 104 and a second mixer 105, and the far-end transmission device 30 may further include a second passive mixer 305 and a third antenna 306.

The second signal generator 104 is configured to: generate a second local-frequency signal, and send the second local-frequency signal to the combiner 102.

The second mixer 105 is configured to receive a third downlink radio frequency signal having the first radio frequency band that is sent by the signal source.

The second mixer 105 is further configured to: receive the second local-frequency signal sent by the second signal generator, perform frequency mixing processing on the third downlink radio frequency signal having the first radio frequency band by using the second local-frequency signal, to form a downlink radio frequency signal having a third radio frequency band, and then send the downlink radio frequency signal having the third radio frequency band to the combiner; or perform frequency mixing processing on the third downlink radio frequency signal having the first radio frequency band by using a local-frequency signal generated by the second mixer, to form a downlink radio frequency signal having a third radio frequency band, and then send the downlink radio frequency signal having the third radio frequency band to the combiner, where the third radio frequency band and the first radio frequency band do not overlap with each other.

The combiner 102 is further configured to: receive the downlink radio frequency signal having the third radio frequency band that is sent by the second mixer and the second local-frequency signal sent by the second signal generator, combine the received downlink radio frequency signal having the third radio frequency band and the received second local-frequency signal into the combined downlink radio frequency signal, and send a downlink radio frequency signal obtained after combination to the divider.

It should be noted that, the combining the received downlink radio frequency signal having the third radio frequency band and the received second local-frequency signal into the combined downlink radio frequency signal may be: combining the received downlink radio frequency signal having the third radio frequency band and the received second local-frequency signal and the original signals in the combined downlink radio frequency signal together to form a combined downlink radio frequency signal again.

The divider 303 is further configured to: obtain the downlink radio frequency signal having the third radio frequency band and the second local-frequency signal, and then send the downlink radio frequency signal having the third radio frequency band and the second local-frequency signal to the second passive mixer.

The second passive mixer 305 is configured to: perform frequency mixing processing on the downlink radio frequency signal having the third radio frequency band by using the second local-frequency signal, to form the third downlink radio frequency signal having the first radio frequency band, and then send the third downlink radio frequency signal having the first radio frequency band to the third antenna.

The third antenna 306 is configured to transmit the received third downlink radio frequency signal having the first radio frequency band.

It should be noted that, in the description in the foregoing example of the present disclosure, an example in which the DAS supports same-frequency-band double-stream processing is used, but a case in which there are more than two (that is, multiple) uplink radio frequency signals having a same frequency band is not excluded. Processing of more than two uplink radio frequency signals should also be included in the technical solution described in this example. Therefore, the DAS may transmit multiple signals having a same frequency band at the same time, thereby greatly increasing the system capacity of the DAS.

Figure 5:
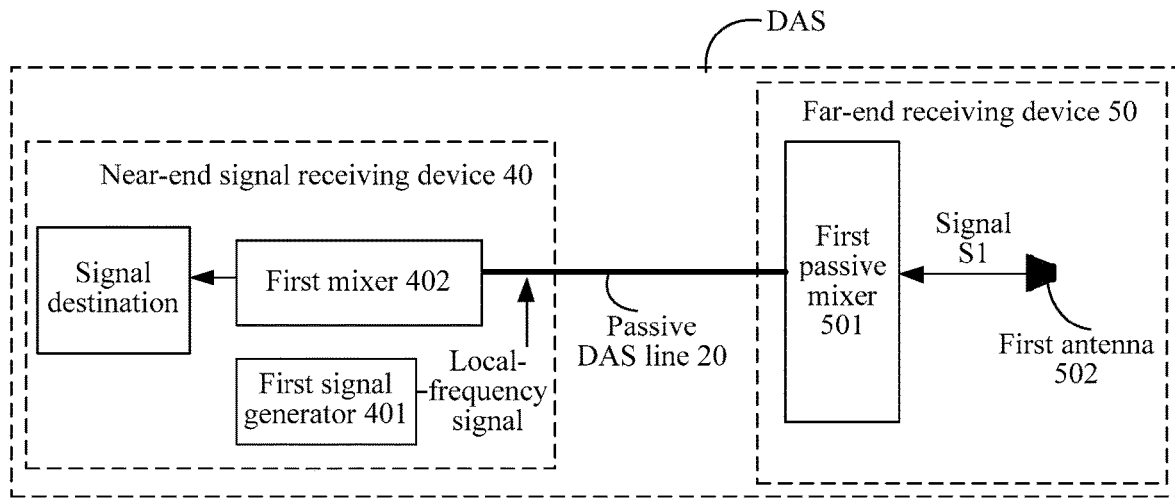
FIG. 5 is a structural diagram of another DAS according to an example of the present disclosure.

In a communication process, as a reverse process for sending a downlink signal, the distributed antenna system may further be used to receive an uplink signal, and process the uplink signal. It may be understood that processing of the uplink signal may be a reverse process for processing of the downlink signal, or there may be some differences between processing of the uplink signal and processing of the downlink signal. When there is a difference, there may be some differences between a module for processing the uplink signal and a module for processing the downlink signal. Specifically, as shown in FIG. 5, the DAS may further include a near-end signal receiving device 40, the passive DAS line 20, and a far-end receiving device 50.

The near-end receiver 40 is located at an output end of the passive DAS line 20. The far-end receiving device 50 is located at an input end of the passive DAS line 20. It should be noted that, the input end and the output end are determined relative to a transmission direction of an uplink radio frequency signal, and specific positions of the devices are not limited.

The near-end signal receiving device 40 is configured to receive a signal, is located in an equipment room, and may include any device that receives a signal and a device that performs processing such as frequency mixing or combination on received signals. The near-end signal receiving device 40 may include a signal destination, a first signal generator 401, and a first mixer 402. The signal destination may be any device that may receive a signal, for example, a device such as a macro base station, a micro base station, a repeater, a remote radio unit (RRU), a pico base station, or a pico RRU.

The passive DAS line 20 is configured to transmit a signal generated at the near end to an indoor antenna, and send the signal to a user by using the indoor antenna. The passive DAS line 20 may be a line including devices such as a coupler and a power splitter.

The far-end receiving device 50 is configured to receive a signal, is located at a position such as an indoor ceiling, and may include a first passive mixer 501 and a first antenna 502. An output end of the first antenna 502 is connected to an input end of the first passive mixer 501.

The first signal generator 401 is configured to: generate a first local-frequency signal, and send the first local-frequency signal to the first passive mixer by using the passive DAS line.

The first antenna 502 is configured to: receive a first uplink radio frequency signal having a first radio frequency band, and send the first uplink radio frequency signal having the first radio frequency band to the first passive mixer.

The first passive mixer 501 is configured to: receive the first local-frequency signal, perform frequency mixing processing on the first uplink radio frequency signal having the first radio frequency band by using the received first local-frequency signal, to form an uplink radio frequency signal having a second radio frequency band, and then send the uplink radio frequency signal having the second radio frequency band to the first mixer by using the passive DAS line.

The first mixer 402 is configured to receive the uplink radio frequency signal having the second radio frequency band.

The first mixer 402 is further configured to: perform frequency mixing processing on the received uplink radio frequency signal having the second radio frequency band by using the first local-frequency signal generated by the first signal generator, to form the first uplink radio frequency signal having the first radio frequency band, and then send the first uplink radio frequency signal having the first radio frequency band to the signal destination; or perform frequency mixing processing on the received uplink radio frequency signal having the second radio frequency band by using a local-frequency signal generated by the first mixer, to form the first uplink radio frequency signal having the first radio frequency band, and then send the first uplink radio frequency signal having the first radio frequency band to the signal destination.

Figure 6:
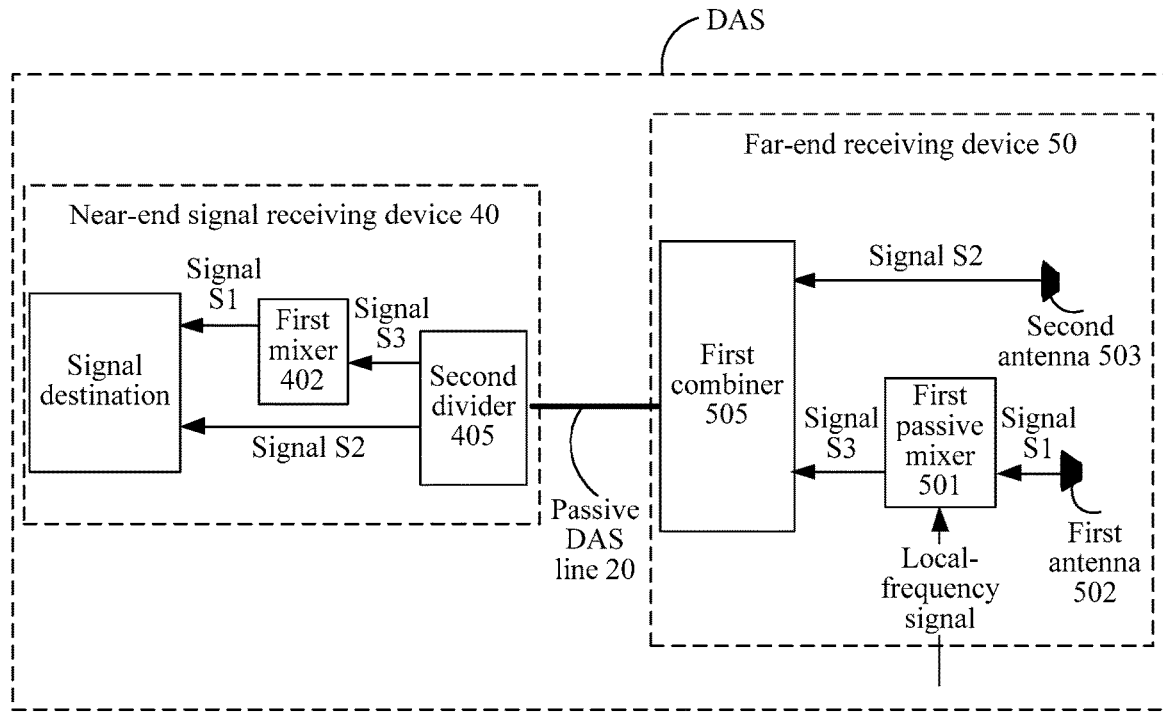
FIG. 6 is a structural diagram of another DAS according to an example of the present disclosure.

Further, the DAS provided in this example of the present disclosure may further support same-frequency-band double-stream transmission, to expand the capacity of the DAS system. For example, an uplink radio frequency signal and a converted uplink radio frequency signal may be combined together for transmission. Specifically, as shown in FIG. 6, the far-end receiving device 50 further includes a second antenna 503 and a first combiner 505, and the near-end signal receiving device 40 further includes a second divider 405.

The second antenna 503 is configured to: receive a second uplink radio frequency signal having the first radio frequency band, and send the second uplink radio frequency signal having the first radio frequency band to the first combiner 505.

The first passive mixer 501 is specifically configured to send the uplink radio frequency signal having the second radio frequency band to the first combiner 505.

The first combiner 505 is configured to: receive the second uplink radio frequency signal having the first radio frequency band that is sent by the second antenna and the uplink radio frequency signal having the second radio frequency band that is sent by the first passive mixer 501, perform combination processing on the second uplink radio frequency signal having the first radio frequency band and the uplink radio frequency signal having the second radio frequency band, to form a combined uplink radio frequency signal, and then send the combined uplink radio frequency signal to the second divider by using the passive DAS line, where the first radio frequency band and the second radio frequency band do not overlap with each other.

The second divider 405 is configured to: receive the combined uplink radio frequency signal, separate the signals in the received combined uplink radio frequency signal, to obtain the second uplink radio frequency signal having the first radio frequency band, and then send the second uplink radio frequency signal having the first radio frequency band to the signal destination, and to obtain the uplink radio frequency signal having the second radio frequency band, and then send the uplink radio frequency signal having the second radio frequency band to the first mixer 402.

The first mixer 402 is specifically configured to receive the uplink radio frequency signal having the second radio frequency band that is sent by the second divider.

Figure 7:
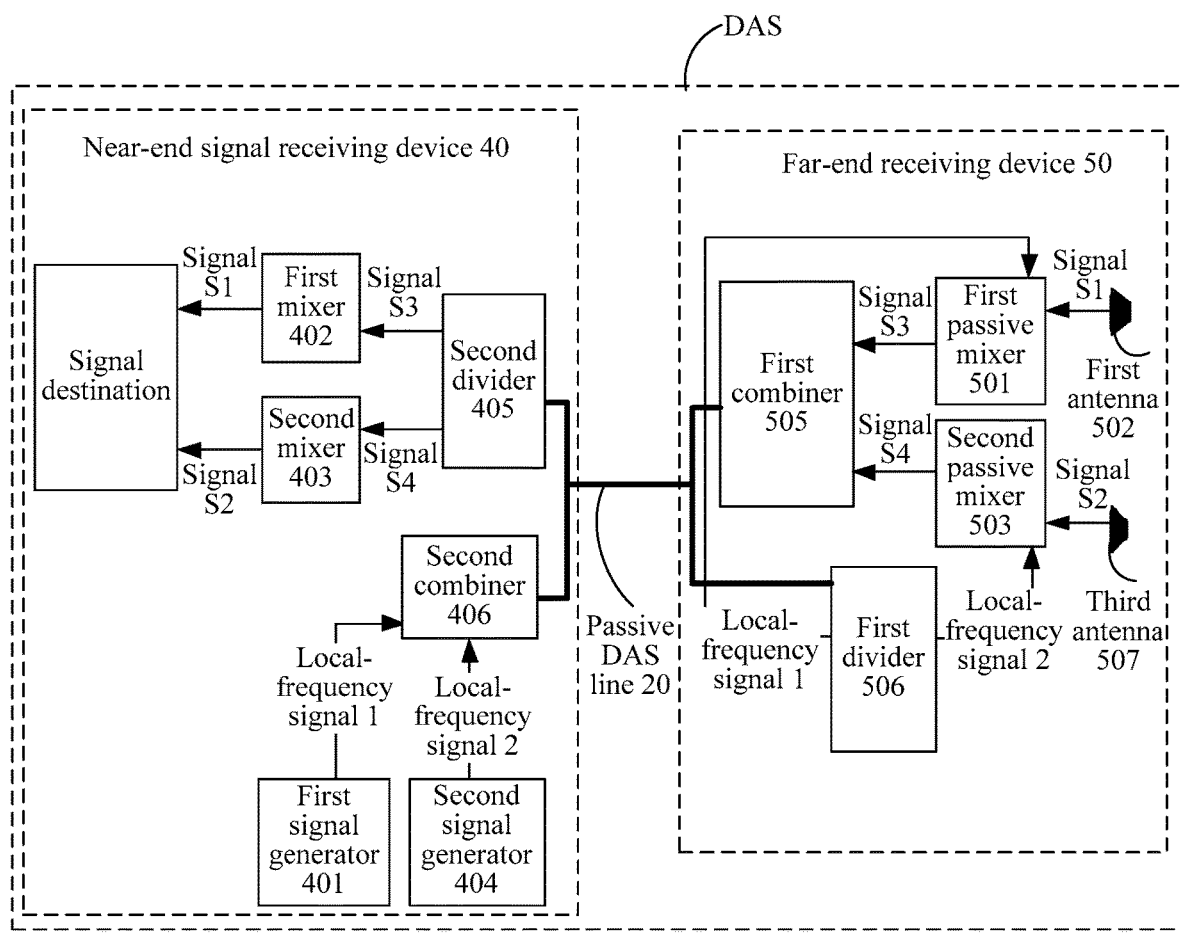
FIG. 7 is a structural diagram of another DAS according to an example of the present disclosure.

Further, to better improve the transmission capacity of the DAS system, the DAS provided in this example of the present disclosure may further support transmission of multiple signals having a same radio frequency band. For example, after frequency mixing processing is separately performed on at least two uplink radio frequency signals having a same frequency band, signals having different frequency bands are formed and then combined together and sent to the signal destination at the near end. Specifically, as shown in FIG. 7, the near-end signal receiving device further includes a second signal generator 404, a second combiner 406, and a second mixer 403, and the far-end receiving device further includes a third antenna 507, a second passive mixer 503, and a first divider 506506.

The second signal generator 404 is configured to: generate a second local-frequency signal, and send the second local-frequency signal to the second combiner 406.

The first signal generator 401 is specifically configured to send the first local-frequency signal to the second combiner 406.

The second combiner 406 is configured to: receive the first local-frequency signal sent by the first signal generator 401 and the second local-frequency signal sent by the second signal generator 404, and perform combination processing on the first local-frequency signal and the second local-frequency signal, to form a first combined signal, and then send the first combined signal to the first divider 506506 by using the passive DAS line.

The first divider 506506 is configured to: receive the first combined signal, separate the signals in the first combined signal, to obtain the first local-frequency signal, and then send the first local-frequency signal to the first passive mixer 501, and to obtain the second local-frequency signal, and then send the second local-frequency signal to the second passive mixer 503.

The first passive mixer 501 is specifically configured to receive the first local-frequency signal sent by the first divider 506506.

The third antenna 507 is configured to: receive a third uplink radio frequency signal having the first radio frequency band, and send the third uplink radio frequency signal having the first radio frequency band to the second passive mixer 503.

The second passive mixer 503 is configured to: receive the second local-frequency signal sent by the first divider 506506 and the third uplink radio frequency signal having the first radio frequency band that is sent by the third antenna 507, perform frequency mixing processing on the third uplink radio frequency signal having the first radio frequency band by using the second local-frequency signal, to form an uplink radio frequency signal having a third radio frequency band, and then send the uplink radio frequency signal having the third radio frequency band to the first combiner 505, where the third radio frequency band and the second radio frequency band do not overlap with each other.

The first combiner 505 is further configured to: receive the uplink radio frequency signal having the third radio frequency band that is sent by the second passive mixer 503, combine the uplink radio frequency signal having the third radio frequency band into the combined uplink radio frequency signal, and send an uplink radio frequency signal obtained after combination to the second divider by using the passive DAS line.

The second divider 405 is further configured to: obtain the uplink radio frequency signal having the third radio frequency band, and then send the uplink radio frequency signal having the third radio frequency band to the second mixer 403.

The second mixer 403 is configured to receive the uplink radio frequency signal having the third radio frequency band that is sent by the second divider.

The second mixer 403 is further configured to: perform frequency mixing processing on the uplink radio frequency signal having the third radio frequency band by using the second local-frequency signal generated by the second signal generator 404, to form the third uplink radio frequency signal having the first radio frequency band, and then send the third uplink radio frequency signal having the first radio frequency band to the signal destination; or perform frequency mixing processing on the uplink radio frequency signal having the third radio frequency band by using a local-frequency signal generated by the second mixer 403, to form the third uplink radio frequency signal having the first radio frequency band, and then send the third uplink radio frequency signal having the first radio frequency band to the signal destination.

It should be noted that, in the description in the foregoing example of the present disclosure, an example in which the DAS supports same-frequency-band double-stream processing is used, but a case in which there are more than two (that is, multiple) uplink radio frequency signals having a same frequency band is not excluded. Processing of more than two uplink radio frequency signals should also be included in the technical solution described in this example. Therefore, the DAS may transmit multiple signals having a same frequency band at the same time, thereby greatly increasing the system capacity of the DAS.

It should be noted that, the distributed antenna system DAS provided in this example of the present disclosure may be applied to a wireless communications network. The wireless communications network may include the DAS, and may further include user equipment served by the passive DAS. In addition, the numbers such as "first", "second", "third", and "fourth" in this example of this application are intended for clear description or differentiation only, and do not indicate superiority or inferiority of a solution.

It can be known from above that, this example of the present disclosure provides a distributed antenna system, including a near-end signal generation device, a passive DAS line, and a far-end transmission device. The near-end signal generation device includes a signal source and a first signal generator, and the far-end transmission device includes a first passive mixer and a first antenna. The first signal generator is configured to: generate a first local-frequency signal, and send the first local-frequency signal to the first passive mixer by using the passive DAS line. The first passive mixer is configured to receive the first local-frequency signal, and a downlink radio frequency signal having a second radio frequency band. The first passive mixer is further configured to: perform frequency mixing processing on the received downlink radio frequency signal having the second radio frequency band by using the first local-frequency signal, to form the first downlink radio frequency signal having a first radio frequency band, and then send the first downlink radio frequency signal having the first radio frequency band to the first antenna. The first antenna is configured to transmit the received first downlink radio frequency signal having the first radio frequency band. Compared with other DAS systems, a passive mixer is provided on a far-end transmission device, and frequency mixing processing is performed by using a local-frequency signal transferred to the passive mixer by another device. That is, the passive mixer does not need to generate a local-frequency signal and does not need power to be supplied to the passive mixer, thereby avoiding problems of high construction difficulty and high costs resulted from a solution in which power is supplied to an active mixer at a far end in a DAS.

Figure 8:
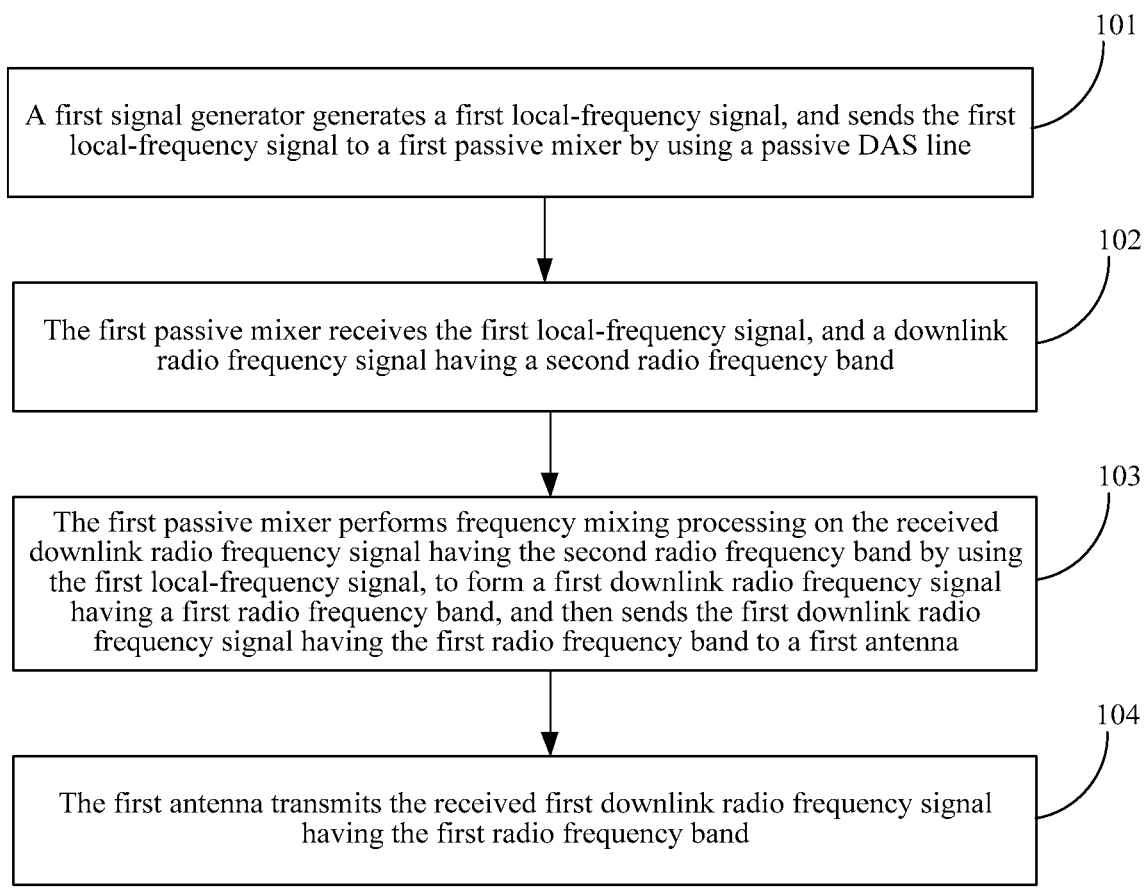
FIG. 8 is a flowchart of another signal transmission method according to an example of the present disclosure.

FIG. 8 shows a signal transmission method according to an example of the present disclosure. The signal transmission method is executed by the DAS described in the above example. The DAS includes a near-end signal generation device, a passive DAS line, and a far-end transmission device. The near-end signal generation device includes a signal source and a first signal generator, and the far-end transmission device includes a first passive mixer and a first antenna. As shown in FIG. 8, the method may include the following steps.

Step 101. The first signal generator generates a first local-frequency signal, and sends the first local-frequency signal to the first passive mixer by using the passive DAS line.

Step 102. The first passive mixer receives the first local-frequency signal, and a downlink radio frequency signal having a second radio frequency band.

The downlink radio frequency signal having the second radio frequency band is a signal that is generated after frequency mixing is performed on the first local-frequency signal and a first downlink radio frequency signal having a first radio frequency band that is sent by the signal source. The first radio frequency band and the second radio frequency band do not overlap with each other.

Optionally, the downlink radio frequency signal having the second radio frequency band may be a signal that is relatively suitable for transmission by using the passive DAS line. That is, an attenuation of the downlink radio frequency signal having the second radio frequency band that is caused when the downlink radio frequency signal is transmitted by using the passive DAS line is less than an attenuation of the first downlink radio frequency signal that is caused when the first downlink radio frequency signal is transmitted by using the passive DAS line, so that an attenuation during signal transmission is reduced, and a signal transmission distance is increased.

Step 103. The first passive mixer performs frequency mixing processing on the received downlink radio frequency signal having the second radio frequency band by using the first local-frequency signal, to form the first downlink radio frequency signal having a first radio frequency band, and then sends the first downlink radio frequency signal having the first radio frequency band to the first antenna.

The frequency mixing processing may be up-conversion processing, or may be down-conversion processing. The up-conversion processing may be: adding a frequency band of the first local-frequency signal and the second radio frequency band, to move the frequency band of the downlink radio frequency signal to the first radio frequency band higher than the second radio frequency band. The down-conversion processing may be: subtracting the frequency band of the first local-frequency signal from the second radio frequency band, to move the frequency band of the downlink radio frequency signal to the first radio frequency band lower than the second radio frequency band.

For example, if the first radio frequency band is F1=[1.850-1.860] GHz, and the second radio frequency band is F2=[0.850-0.860] GHz, the first passive mixer 301 may up-convert the signal having the second radio frequency band F2=[0.850-0.860] GHz to the frequency band F1=[1.850-1.860] GHz by using the first local-frequency signal F=1 GHz.

If the first radio frequency band is F1=[1.850-1.860] GHz, and the second radio frequency band is F2=[2.050-2.060] GHz, the first passive mixer 301 may down-convert the signal having the second radio frequency band F2=[2.050-2.060] GHz to the frequency band F1=[1.850-1.860] GHz by using the first local-frequency signal F=0.200 GHz.

Step 104. The first antenna transmits the received first downlink radio frequency signal having the first radio frequency band.

Optionally, in this example of the present disclosure, the downlink radio frequency signal obtained after frequency mixing processing at the near end and the local-frequency signal may be combined together and transmitted to the first passive mixer by using the passive DAS line. Specifically, the near-end signal generation device may include a first mixer and a combiner, and the far-end transmission device further includes a divider.

The sending, by the first signal generator, the first local-frequency signal to the first passive mixer specifically includes:

sending, by the first signal generator, the first local-frequency signal to the combiner, and sending, by the combiner, the first local-frequency signal to the first passive mixer;

before the receiving, by the first passive mixer, a downlink radio frequency signal having a second radio frequency band, the method further includes:

receiving, by the first mixer, the first downlink radio frequency signal having the first radio frequency band that is sent by the signal source;

performing, by the first mixer, frequency mixing processing on the first downlink radio frequency signal by using the first local-frequency signal generated by the first signal generator, and sending, to the combiner, the downlink radio frequency signal having the second radio frequency band that is generated after frequency mixing; or performing frequency mixing processing on the first downlink radio frequency signal by using a local-frequency signal generated by the first mixer, and sending, to the combiner, the downlink radio frequency signal having the second radio frequency band that is generated after frequency mixing;

receiving, by the combiner, the downlink radio frequency signal having the second radio frequency band and the first local-frequency signal, combining the received downlink radio frequency signal having the second radio frequency band and the received first local-frequency signal, to form a combined downlink radio frequency signal, and then sending the combined downlink radio frequency signal to the divider by using the passive DAS line; and receiving, by the divider, the combined downlink radio frequency signal, separating the signals included in the received combined downlink radio frequency signal, to obtain the downlink radio frequency signal having the second radio frequency band and the first local-frequency signal, and then sending the downlink radio frequency signal having the second radio frequency band and the first local-frequency signal to the first passive mixer; and the receiving, by the first passive mixer, the first local-frequency signal, and a downlink radio frequency signal having a second radio frequency band specifically includes:

receiving, by the first passive mixer, the first local-frequency signal and the downlink radio frequency signal having the second radio frequency band that are sent by the divider.

Further, the DAS provided in this example of the present disclosure may further support same-frequency-band double-stream transmission. For example, a downlink radio frequency signal and a converted downlink radio frequency signal may be combined together for transmission. Specifically, the far-end transmission device may further include a second antenna. The method may further include:

receiving, by the combiner, a second downlink radio frequency signal having the first radio frequency band that is sent by the signal source, combining the second downlink radio frequency signal into the combined downlink radio frequency signal, and sending a downlink radio frequency signal obtained after combination to the divider;

obtaining, by the divider, the second downlink radio frequency signal having the first radio frequency band, and then sending the second downlink radio frequency signal having the first radio frequency band to the second antenna; and transmitting, by the second antenna, the received second downlink radio frequency signal having the first radio frequency band.

The combining the first downlink radio frequency signal into the combined downlink radio frequency signal to form a second combined downlink radio frequency signal may include: combining the first downlink radio frequency signal and the original signals in the combined downlink radio frequency signal together to form the second combined downlink radio frequency signal again.

In this way, two signals having a same frequency band are transmitted by using the DAS system. Compared with other DAS systems supporting only single-stream transmission, a system capacity is increased.

Further, to better improve the transmission capacity of the DAS system, the DAS provided in this example of the present disclosure may further support transmission of multiple signals having a same radio frequency band. For example, after frequency mixing processing is separately performed on at least two downlink radio frequency signals having a same frequency band, signals having different frequency bands are formed and then combined together and sent to the far end. After the multiple radio frequency signals are obtained at the far end according to the combined signal, the multiple radio frequency signals are transmitted by using multiple antennas. Specifically, the near-end signal generation device may further include a second signal generator and a second mixer, and the far-end transmission device further includes a second passive mixer and a third antenna. The method may further include:

generating, by the second signal generator, a second local-frequency signal, and sending the second local-frequency signal to the combiner;

receiving, by the second mixer, a third downlink radio frequency signal having the first radio frequency band that is sent by the signal source;

receiving, by the second mixer, the second local-frequency signal sent by the second signal generator, performing frequency mixing processing on the third downlink radio frequency signal having the first radio frequency band by using the second local-frequency signal, to form a downlink radio frequency signal having a third radio frequency band, and then sending the downlink radio frequency signal having the third radio frequency band to the combiner; or performing frequency mixing processing on the third downlink radio frequency signal having the first radio frequency band by using a local-frequency signal generated by the second mixer, to form a downlink radio frequency signal having a third radio frequency band, and then sending the downlink radio frequency signal having the third radio frequency band to the combiner, where the third radio frequency band and the first radio frequency band do not overlap with each other;

receiving, by the combiner, the downlink radio frequency signal having the third radio frequency band that is sent by the second mixer and the second local-frequency signal sent by the second signal generator, combining the received downlink radio frequency signal having the third radio frequency band and the received second local-frequency signal into the combined downlink radio frequency signal, and sending a downlink radio frequency signal obtained after combination to the divider;

obtaining, by the divider, the downlink radio frequency signal having the third radio frequency band and the second local-frequency signal, and then sending the downlink radio frequency signal having the third radio frequency band and the second local-frequency signal to the second passive mixer;

performing, by the second passive mixer, frequency mixing processing on the downlink radio frequency signal having the third radio frequency band by using the second local-frequency signal, to form the third downlink radio frequency signal having the first radio frequency band, and then sending the third downlink radio frequency signal having the first radio frequency band to the third antenna; and transmitting, by the third antenna, the received third downlink radio frequency signal having the first radio frequency band, where one of the at least one third antenna transmits the received downlink radio frequency signal having the first radio frequency band.

The combining the received downlink radio frequency signal having the third radio frequency band and the received second local-frequency signal into the combined downlink radio frequency signal, to form a third combined downlink radio frequency signal may include: combining the received downlink radio frequency signal having the third radio frequency band, the received second local-frequency signal, and the original signals in the combined downlink radio frequency signal together, to form the combined downlink radio frequency signal again.

It should be noted that, in the description in the foregoing example of the present disclosure, an example in which the DAS supports same-frequency-band double-stream processing is used, but a case in which there are more than two (that is, multiple) uplink radio frequency signals having a same frequency band is not excluded. Processing of more than two uplink radio frequency signals should also be included in the technical solution described in this example. Therefore, the DAS may transmit multiple signals having a same frequency band at the same time, thereby greatly increasing the system capacity of the DAS.

Figure 9:
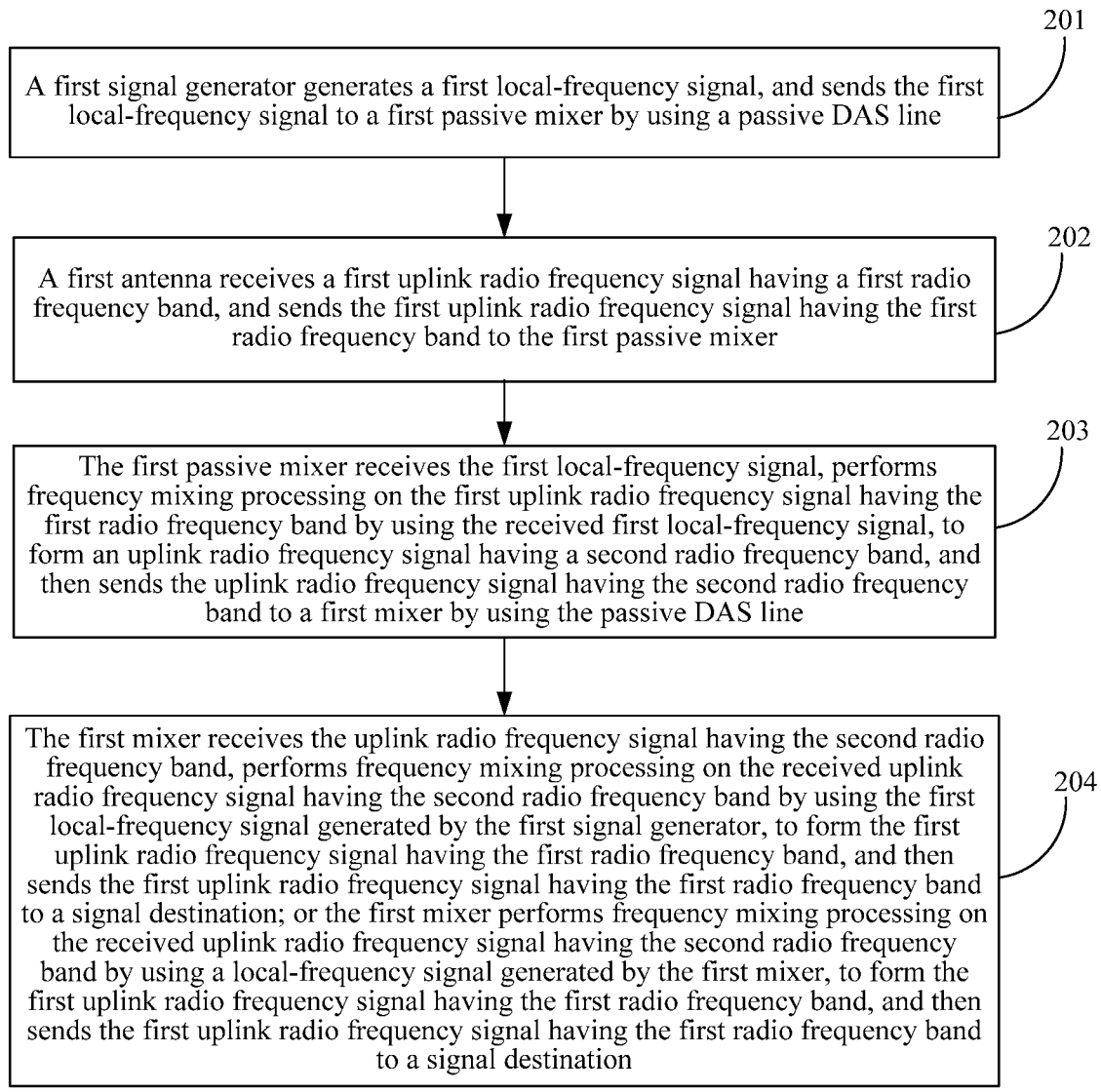
FIG. 9 is a flowchart of another signal transmission method according to an example of the present disclosure.

In a communication process, as a reverse process for sending a downlink signal, the distributed antenna system may further be used to receive an uplink signal, and process the uplink signal. It may be understood that processing of the uplink signal may be a reverse process for processing of the downlink signal, or there may be some differences between processing of the uplink signal and processing of the downlink signal. For example, FIG. 9 shows another signal transmission method according to an example of the present disclosure. The signal transmission method is executed by a distributed antenna system DAS. The DAS includes a near-end signal receiving device, a passive DAS line, and a far-end receiving device. The near-end signal receiving device includes a signal destination, a first signal generator, and a first mixer, and the far-end receiving device includes a first passive mixer and a first antenna. As shown in FIG. 9, the method may include the following steps.

Step 201. The first signal generator generates a first local-frequency signal, and sends the first local-frequency signal to the first passive mixer by using the passive DAS line.

Step 202. The first antenna receives a first uplink radio frequency signal having a first radio frequency band, and sends the first uplink radio frequency signal having the first radio frequency band to the first passive mixer.

Step 203. The first passive mixer receives the first local-frequency signal, performs frequency mixing processing on the first uplink radio frequency signal having the first radio frequency band by using the received first local-frequency signal, to form an uplink radio frequency signal having a second radio frequency band, and then sends the uplink radio frequency signal having the second radio frequency band to the first mixer by using the passive DAS line.

Step 204. The first mixer receives the uplink radio frequency signal having the second radio frequency band, performs frequency mixing processing on the received uplink radio frequency signal having the second radio frequency band by using the first local-frequency signal generated by the first signal generator, to form the first uplink radio frequency signal having the first radio frequency band, and then sends the first uplink radio frequency signal having the first radio frequency band to the signal destination; or the first mixer performs frequency mixing processing on the received uplink radio frequency signal having the second radio frequency band by using a local-frequency signal generated by the first mixer, to form the first uplink radio frequency signal having the first radio frequency band, and then sends the first uplink radio frequency signal having the first radio frequency band to the signal destination.

Further, the DAS provided in this example of the present disclosure may further support same-frequency-band double-stream transmission, to expand a capacity of the DAS system. For example, an uplink radio frequency signal and a converted uplink radio frequency signal may be combined together for transmission. Specifically, the far-end receiving device may further include a second antenna and a first combiner, and the near-end signal receiving device may further include a second divider.

The sending, by the first passive mixer, the uplink radio frequency signal having the second radio frequency band to the first mixer specifically includes:

sending, by the first passive mixer, the uplink radio frequency signal having the second radio frequency band to the first combiner;

the method further includes:

receiving, by the second antenna, a second uplink radio frequency signal having the first radio frequency band, and sending the second uplink radio frequency signal having the first radio frequency band to the first combiner;

receiving, by the first combiner, the second uplink radio frequency signal having the first radio frequency band that is sent by the second antenna and the uplink radio frequency signal having the second radio frequency band that is sent by the first passive mixer, performing combination processing on the second uplink radio frequency signal having the first radio frequency band and the uplink radio frequency signal having the second radio frequency band, to form a combined uplink radio frequency signal, and then sending the combined uplink radio frequency signal to the second divider by using the passive DAS line, where the first radio frequency band and the second radio frequency band do not overlap with each other; and receiving, by the second divider, the combined uplink radio frequency signal, separating the signals in the received combined uplink radio frequency signal, to obtain the second uplink radio frequency signal having the first radio frequency band, and then sending the second uplink radio frequency signal having the first radio frequency band to the signal destination, and to obtain the uplink radio frequency signal having the second radio frequency band, and then sending the uplink radio frequency signal having the second radio frequency band to the first mixer; and the receiving, by the first mixer, the uplink radio frequency signal having the second radio frequency band specifically includes:

receiving, by the first mixer, the uplink radio frequency signal having the second radio frequency band that is sent by the second divider.

Further, to better improve the transmission capacity of the DAS system, the DAS provided in this example of the present disclosure may further support transmission of multiple signals having a same radio frequency band. For example, after frequency mixing processing is separately performed on at least two uplink radio frequency signals having a same frequency band, signals having different frequency bands are formed and then combined together and sent to the signal destination at the near end. Specifically, the near-end signal receiving device may further include a second signal generator, a second combiner, and a second mixer, and the far-end receiving device may further include a third antenna, a second passive mixer, and a first divider.

The sending, by the first signal generator, the first local-frequency signal specifically includes:

sending, by the first signal generator, the first local-frequency signal to the second combiner; and the method further includes:

generating, by the second signal generator, a second local-frequency signal, and sending the second local-frequency signal to the second combiner;

receiving, by the second combiner, the first local-frequency signal sent by the first signal generator and the second local-frequency signal sent by the second signal generator, and performing combination processing on the first local-frequency signal and the second local-frequency signal, to form a first combined signal, and then sending the first combined signal to the first divider by using the passive DAS line;

receiving, by the first divider, the first combined signal, separating the signals in the first combined signal, to obtain the first local-frequency signal, and then sending the first local-frequency signal to the first passive mixer, and to obtain the second local-frequency signal, and then sending the second local-frequency signal to the second passive mixer;

receiving, by the third antenna, a third uplink radio frequency signal having the first radio frequency band, and sending the third uplink radio frequency signal having the first radio frequency band to the second passive mixer;

receiving, by the second passive mixer, the second local-frequency signal sent by the first divider and the third uplink radio frequency signal having the first radio frequency band that is sent by the third antenna, performing frequency mixing processing on the third uplink radio frequency signal having the first radio frequency band by using the second local-frequency signal, to form an uplink radio frequency signal having a third radio frequency band, and then sending the uplink radio frequency signal having the third radio frequency band to the first combiner, where the third radio frequency band and the second radio frequency band do not overlap with each other;

receiving, by the first combiner, the uplink radio frequency signal having the third radio frequency band that is sent by the second passive mixer, combining the uplink radio frequency signal having the third radio frequency band into the combined uplink radio frequency signal, and sending an uplink radio frequency signal obtained after combination to the second divider by using the passive DAS line;

obtaining, by the second divider, the uplink radio frequency signal having the third radio frequency band, and then sending the uplink radio frequency signal having the third radio frequency band to the second mixer;

receiving, by the second mixer, the uplink radio frequency signal having the third radio frequency band that is sent by the second divider; and performing, by the second mixer, frequency mixing processing on the uplink radio frequency signal having the third radio frequency band by using the second local-frequency signal generated by the second signal generator, to form the third uplink radio frequency signal having the first radio frequency band, and then sending the third uplink radio frequency signal having the first radio frequency band to the signal destination; or performing frequency mixing processing on the uplink radio frequency signal having the third radio frequency band by using a local-frequency signal generated by the second mixer, to form the third uplink radio frequency signal having the first radio frequency band, and then sending the third uplink radio frequency signal having the first radio frequency band to the signal destination.

It should be noted that, in the description in the foregoing example of the present disclosure, an example in which the DAS supports same-frequency-band double-stream processing is used, but a case in which there are more than two (that is, multiple) uplink radio frequency signals having a same frequency band is not excluded. Processing of more than two uplink radio frequency signals should also be included in the technical solution described in this example. Therefore, the DAS may transmit multiple signals having a same frequency band at the same time, thereby greatly increasing the system capacity of the DAS.

It should be noted that, the distributed antenna system DAS provided in this example of the present disclosure may be applied to a wireless communications network. The wireless communications network may include the DAS, and may further include user equipment served by the passive DAS. In addition, the numbers such as "first", "second", "third", and "fourth" in this example of this application are intended for clear description or differentiation only, and do not indicate superiority or inferiority of a solution.

It can be known from above that, this example of the present disclosure provides a signal transmission method executed by a distributed antenna system DAS. The DAS includes a near-end signal generation device, a passive DAS line, and a far-end transmission device. The near-end signal generation device includes a signal source and a first signal generator, and the far-end transmission device includes a first passive mixer and a first antenna. The first signal generator generates a first local-frequency signal, and sends the first local-frequency signal to the first passive mixer by using the passive DAS line. The first passive mixer receives the first local-frequency signal, and a downlink radio frequency signal having a second radio frequency band. The first passive mixer performs frequency mixing processing on the received downlink radio frequency signal having the second radio frequency band by using the first local-frequency signal, to form the first downlink radio frequency signal having a first radio frequency band, and then sends the first downlink radio frequency signal having the first radio frequency band to the first antenna. The first antenna transmits the received first downlink radio frequency signal having the first radio frequency band. Compared with other DAS systems, a passive mixer is provided on a far-end transmission device, and frequency mixing processing is performed by using a local-frequency signal transferred to the passive mixer by another device. That is, the passive mixer does not need to generate a local-frequency signal and does not need power to be supplied to the passive mixer, thereby avoiding problems of high construction difficulty and high costs resulted from a solution in which power is supplied to an active mixer at a far end in a DAS.

Figure 10:
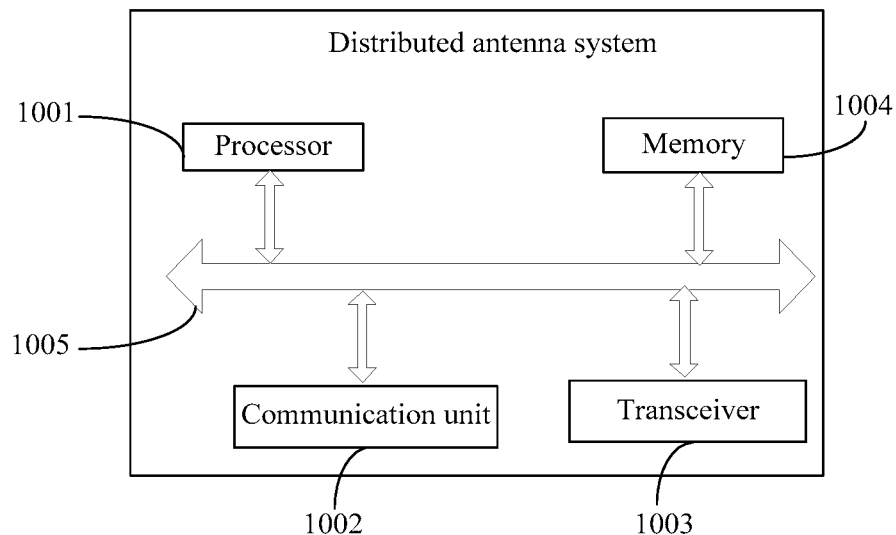
FIG. 10 is a structural diagram of another DAS according to an example of the present disclosure.

FIG. 10 is a structural diagram of a distributed antenna system DAS according to an example of the present disclosure, used to execute the method described in the above example. As shown in FIG. 10, the distributed antenna system DAS may include a processor 1001, a communication unit 1002, a transceiver 1003, a memory 1004, and a passive DAS line 1005. The passive DAS line 1005 is configured to implement connection and mutual communication among these devices.

The processor 1001 may be a central processing unit (CPU).

The memory 1004 may be a volatile memory, for example, a random-access memory (RAM), or a non-volatile memory, for example, a read-only memory (ROM), a flash memory, a hard disk drive (HDD), or a solid-state drive (SSD), or a combination of the foregoing types of memories. The memory 1004 provides an instruction and data to the processor 1001.

The communication unit 1002 is configured to receive a first local-frequency signal, and a downlink radio frequency signal having a second radio frequency band.

The downlink radio frequency signal having the second radio frequency band is a signal that is generated after frequency mixing is performed on the first local-frequency signal and a first downlink radio frequency signal having a first radio frequency band that is sent by the signal source. The first radio frequency band and the second radio frequency band do not overlap with each other.

Optionally, the downlink radio frequency signal having the second radio frequency band may be a signal that is relatively suitable for transmission by using the passive DAS line. That is, an attenuation of the downlink radio frequency signal having the second radio frequency band that is caused when the downlink radio frequency signal is transmitted by using the passive DAS line is less than an attenuation of the first downlink radio frequency signal that is caused when the first downlink radio frequency signal is transmitted by using the passive DAS line, so that an attenuation during signal transmission is reduced, and a signal transmission distance is increased.

The processor 1001 is configured to perform frequency mixing processing on the downlink radio frequency signal having the second radio frequency band by using the first local-frequency signal received by the communication unit 1002, to form the first downlink radio frequency signal having the first radio frequency band. The downlink radio frequency signal having the second radio frequency band is a signal that is generated after the first local-frequency signal and the first downlink radio frequency signal having the first radio frequency band, where the first radio frequency band and the second radio frequency band do not overlap with each other.

The frequency mixing processing may be up-conversion processing, or may be down-conversion processing. The up-conversion processing may be: adding a frequency band of the first local-frequency signal and the second radio frequency band, to move the frequency band of the downlink radio frequency signal to the first radio frequency band higher than the second radio frequency band. The down-conversion processing may be: subtracting the frequency band of the first local-frequency signal from the second radio frequency band, to move the frequency band of the downlink radio frequency signal to the first radio frequency band lower than the second radio frequency band.

For example, if the first radio frequency band is F1=[1.850-1.860] GHz, and the second radio frequency band is F2=[0.850-0.860] GHz, the first passive mixer 301 may up-convert the signal having the second radio frequency band F2=[0.850-0.860] GHz to the frequency band F1=[1.850-1.860] GHz by using the first local-frequency signal F=1 GHz.

If the first radio frequency band is F1=[1.850-1.860] GHz, and the second radio frequency band is F2=[2.050-2.060] GHz, the first passive mixer 301 may down-convert the signal having the second radio frequency band F2=[2.050-2.060] GHz to the frequency band F1=[1.850-1.860] GHz by using the first local-frequency signal F=0.200 GHz.

The transceiver 1003 is configured to transmit the first downlink radio frequency signal having the first radio frequency band.

Optionally, the communication unit 1002 is further configured to: before the communication unit 1002 receives the downlink radio frequency signal having the second radio frequency band, receive the first downlink radio frequency signal having the first radio frequency band.

The processor 1001 is further configured to perform frequency mixing processing on the first downlink radio frequency signal received by the communication unit 1002, to form the downlink radio frequency signal having the second radio frequency band.

The communication unit 1002 is further configured to combine the received downlink radio frequency signal having the second radio frequency band that is formed by the processor 1001 and the received first local-frequency signal, to form a combined downlink radio frequency signal.

The processor 1001 is further configured to separate the signals in the combined downlink radio frequency signal formed by the communication unit 1002, to obtain the downlink radio frequency signal having the second radio frequency band and the first local-frequency signal.

Further, the DAS provided in this example of the present disclosure may further support same-frequency-band double-stream transmission. For example, the DAS may combine a downlink radio frequency signal and a converted downlink radio frequency signal together for transmission. Specifically, the communication unit 1002 is further configured to: receive a second downlink radio frequency signal having the first radio frequency band, and combine the second downlink radio frequency signal having the first radio frequency band into the combined downlink radio frequency signal.

The processor 1001 is further configured to obtain the second downlink radio frequency signal having the first radio frequency band from the combined downlink radio frequency signal.

The transceiver 1003 is further configured to transmit the second downlink radio frequency signal having the first radio frequency band.

The combining the first downlink radio frequency signal into the combined downlink radio frequency signal to form a second combined downlink radio frequency signal may include: combining the first downlink radio frequency signal and the original signals in the combined downlink radio frequency signal together to form the second combined downlink radio frequency signal again.

In this way, two signals having a same frequency band are transmitted by using the DAS system. Compared with other DAS systems supporting only single-stream transmission, a system capacity is increased.

Further, to better improve the transmission capacity of the DAS system, the DAS provided in this example of the present disclosure may further support transmission of multiple signals having a same radio frequency band. For example, after frequency mixing processing is separately performed on at least two downlink radio frequency signals having a same frequency band, signals having different frequency bands are formed and then combined together and sent to the far end. After the multiple radio frequency signals are obtained at the far end according to the combined signal, the multiple radio frequency signals are transmitted by using multiple antennas. Specifically, the communication unit 1002 is further configured to receive a second local-frequency signal and a third downlink radio frequency signal having the first radio frequency band.

The processor 1001 is further configured to perform frequency mixing processing on the third downlink radio frequency signal having the first radio frequency band received by the communication unit 1002, to form a downlink radio frequency signal having a third radio frequency band, where the third radio frequency band and the first radio frequency band do not overlap with each other.

The communication unit 1002 is further configured to combine the downlink radio frequency signal having the third radio frequency band and the second local-frequency signal into the combined downlink radio frequency signal.

The processor 1001 is further configured to: obtain the downlink radio frequency signal having the third radio frequency band and the second local-frequency signal according to the combined downlink radio frequency signal; and perform frequency mixing processing on the downlink radio frequency signal having the third radio frequency band by using the second local-frequency signal, to form the third downlink radio frequency signal having the first radio frequency band.

The transceiver 1003 is further configured to transmit the third downlink radio frequency signal having the first radio frequency band.

The combining the received downlink radio frequency signal having the third radio frequency band and the received second local-frequency signal into the combined downlink radio frequency signal, to form a third combined downlink radio frequency signal may include: combining the received downlink radio frequency signal having the third radio frequency band, the received second local-frequency signal, and the original signals in the combined downlink radio frequency signal together, to form the combined downlink radio frequency signal again.

It should be noted that, in the description in the foregoing example of the present disclosure, an example in which the DAS supports same-frequency-band double-stream processing is used, but a case in which there are more than two (that is, multiple) uplink radio frequency signals having a same frequency band is not excluded. Processing of more than two uplink radio frequency signals should also be included in the technical solution described in this example. Therefore, the DAS may transmit multiple signals having a same frequency band at the same time, thereby greatly increasing the system capacity of the DAS.

Figure 11:
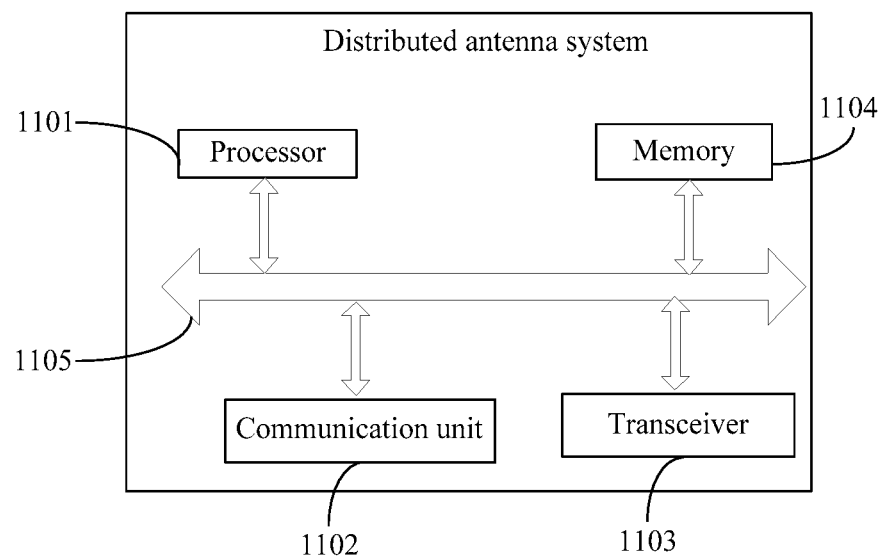
FIG. 11 is a structural diagram of another DAS according to an example of the present disclosure.

In a communication process, as a reverse process for sending a downlink signal, the distributed antenna system may further be used to receive an uplink signal, and process the uplink signal. It may be understood that processing of the uplink signal may be a reverse process for processing of the downlink signal, or there may be some differences between processing of the uplink signal and processing of the downlink signal. For example, FIG. 11 is a structural diagram of a distributed antenna system DAS according to an example of the present disclosure, used to execute the method described in the above example. As shown in FIG. 11, the distributed antenna system DAS may include a processor 1101, a communication unit 1102, a transceiver 1103, a memory 1104, and a passive DAS line 1105. The passive DAS line 1105 is configured to implement connection and mutual communication among these devices.

The processor 1101 may be a central processing unit (CPU).

The memory 1104 may be a volatile memory, for example, a random-access memory (RAM), or a non-volatile memory, for example, a read-only memory (ROM), a flash memory, a hard disk drive (HDD), or a solid-state drive (SSD), or a combination of the foregoing types of memories. The memory 1104 provides an instruction and data to the processor 1101.

The communication unit 1102 is configured to: receive a first local-frequency signal, and send the first local-frequency signal to the transceiver 1103.

The transceiver 1103 is configured to: receive a first uplink radio frequency signal having a first radio frequency band, and perform frequency mixing processing on the first uplink radio frequency signal having the first radio frequency band by using the first local-frequency signal, to form an uplink radio frequency signal having a second radio frequency band.

The processor 1101 is configured to perform frequency mixing processing on the uplink radio frequency signal having the second radio frequency band that is formed by the transceiver 1103, to form the first uplink radio frequency signal having the first radio frequency band.

Further, the DAS provided in this example of the present disclosure may further support same-frequency-band double-stream transmission, to expand a capacity of the DAS system. For example, an uplink radio frequency signal and a converted uplink radio frequency signal may be combined together for transmission. Specifically, the transceiver 1103 is further configured to: receive a second uplink radio frequency signal having the first radio frequency band, and perform combination processing on the second uplink radio frequency signal having the first radio frequency band and the uplink radio frequency signal having the second radio frequency band, to form a combined uplink radio frequency signal, where the first radio frequency band and the second radio frequency band do not overlap with each other.

The processor 1101 is further configured to separate the signals in the combined uplink radio frequency signal received by the transceiver 1103, to obtain the second uplink radio frequency signal having the first radio frequency band.

Further, to better improve the transmission capacity of the DAS system, the DAS provided in this example of the present disclosure may further support transmission of multiple signals having a same radio frequency band. For example, after frequency mixing processing is separately performed on at least two uplink radio frequency signals having a same frequency band, signals having different frequency bands are formed and then combined together and sent to a signal destination at a near end. Specifically, the communication unit 1102 is further configured to: receive a second local-frequency signal, and send the second local-frequency signal to the transceiver 1103.

The transceiver 1103 is further configured to: receive a third uplink radio frequency signal having the first radio frequency band, and perform frequency mixing processing on the third uplink radio frequency signal having the first radio frequency band by using the second local-frequency signal, to form an uplink radio frequency signal having a third radio frequency band, where the third radio frequency band and the second radio frequency band do not overlap with each other.

The transceiver 1103 is further configured to combine the uplink radio frequency signal having the third radio frequency band into the combined uplink radio frequency signal.

The processor 1101 is further configured to separate the signals in the combined uplink radio frequency signal, to obtain the uplink radio frequency signal having the third radio frequency band.

The processor 1101 is further configured to perform frequency mixing processing on the uplink radio frequency signal having the third radio frequency band, to form the third uplink radio frequency signal having the first radio frequency band.

It should be noted that, in the description in the foregoing example of the present disclosure, an example in which the DAS supports same-frequency-band double-stream processing is used, but a case in which there are more than two (that is, multiple) uplink radio frequency signals having a same frequency band is not excluded. Processing of more than two uplink radio frequency signals should also be included in the technical solution described in this example. Therefore, the DAS may transmit multiple signals having a same frequency band at the same time, thereby greatly increasing the system capacity of the DAS.

It should be noted that, the distributed antenna system DAS provided in this example of the present disclosure may be applied to a wireless communications network. The wireless communications network may include the DAS, and may further include user equipment served by the passive DAS. In addition, the numbers such as "first", "second", "third", and "fourth" in this example of this application are intended for clear description or differentiation only, and do not indicate superiority or inferiority of a solution.

It can be known from above that, this example of the present disclosure provides a DAS, including a processor, a communication unit, and a transceiver. The communication unit is configured to receive a first local-frequency signal and a downlink radio frequency signal having a second radio frequency band. The processor is configured to perform frequency mixing processing on the downlink radio frequency signal having the second radio frequency band by using the first local-frequency signal received by the communication unit, to form a first downlink radio frequency signal having a first radio frequency band. The downlink radio frequency signal having the second radio frequency band is a signal that is generated after frequency mixing is performed on the first local-frequency signal and the first downlink radio frequency signal having the first radio frequency band. The first radio frequency band and the second radio frequency band do not overlap with each other. The transceiver is configured to transmit the first downlink radio frequency signal having the first radio frequency band. Compared with other DAS systems, a passive mixer is provided on a far-end transmission device, and frequency mixing processing is performed by using a local-frequency signal transferred to the passive mixer by another device. That is, the passive mixer does not need to generate a local-frequency signal and does not need power to be supplied to the passive mixer, thereby avoiding problems of high construction difficulty and high costs resulted from a solution in which power is supplied to an active mixer at a far end in a DAS.

A transmission architecture of a DAS is provided in the present disclosure, and a distributed antenna system and a signal transmission method are provided, to resolve the problems of a high construction difficulty and high costs resulted from a solution in which power is supplied to an active mixer at a far end in the DAS.

The following technical solutions are used in examples of the present disclosure.

According to a first aspect, an example of the present disclosure provides a distributed antenna system DAS, including a near-end signal generation device, a passive DAS line, and a far-end transmission device, where the near-end signal generation device includes a signal source and a first signal generator, and the far-end transmission device includes a first passive mixer and a first antenna, where the first signal generator is configured to: generate a first local-frequency signal, and send the first local-frequency signal to the first passive mixer by using the passive DAS line;

the first passive mixer is configured to receive the first local-frequency signal, and a downlink radio frequency signal having a second radio frequency band;

the first passive mixer is further configured to: perform frequency mixing processing on the received downlink radio frequency signal having the second radio frequency band by using the first local-frequency signal, to form the first downlink radio frequency signal having a first radio frequency band, and then send the first downlink radio frequency signal having the first radio frequency band to the first antenna; and the first antenna is configured to transmit the received first downlink radio frequency signal having the first radio frequency band.

With reference to the first aspect, in a first implementation of the first aspect, the near-end signal generation device further includes a first mixer and a combiner, and the far-end transmission device further includes the divider, where the first mixer is configured to receive the first downlink radio frequency signal having the first radio frequency band that is sent by the signal source;

the first mixer is further configured to: perform frequency mixing processing on the first downlink radio frequency signal by using the first local-frequency signal generated by the first signal generator, and send, to the combiner, the downlink radio frequency signal having the second radio frequency band that is generated after frequency mixing; or perform frequency mixing processing on the first downlink radio frequency signal by using a local-frequency signal generated by the first mixer, and send, to the combiner, the downlink radio frequency signal having the second radio frequency band that is generated after frequency mixing;

the first signal generator is specifically configured to send the first local-frequency signal to the combiner;

the combiner is configured to: receive the downlink radio frequency signal having the second radio frequency band and the first local-frequency signal, combine the received downlink radio frequency signal having the second radio frequency band and the received first local-frequency signal, to form a combined downlink radio frequency signal, and then send the combined downlink radio frequency signal to the divider by using the passive DAS line;

the divider is configured to: receive the combined downlink radio frequency signal, separate the signals included in the received combined downlink radio frequency signal, to obtain the downlink radio frequency signal having the second radio frequency band and the first local-frequency signal, and then send the downlink radio frequency signal having the second radio frequency band and the first local-frequency signal to the first passive mixer; and the first passive mixer receives the first local-frequency signal and the downlink radio frequency signal having the second radio frequency band, where specifically, the first passive mixer receives the first local-frequency signal and the downlink radio frequency signal having the second radio frequency band that are sent by the divider.

With reference to the first implementation of the first aspect, in a second implementation of the first aspect, the far-end transmission device further includes a second antenna, where the combiner is further configured to: receive a second downlink radio frequency signal having the first radio frequency band that is sent by the signal source, combine the second downlink radio frequency signal into the combined downlink radio frequency signal, and send a downlink radio frequency signal obtained after combination to the divider;

the divider is further configured to: obtain the second downlink radio frequency signal having the first radio frequency band, and then send the second downlink radio frequency signal having the first radio frequency band to the second antenna; and the second antenna is configured to transmit the received second downlink radio frequency signal having the first radio frequency band.

With reference to the first implementation of the first aspect or the second implementation of the first aspect, in a third implementation of the first aspect, the near-end signal generation device further includes a second signal generator and a second mixer, and the far-end transmission device further includes a second passive mixer and a third antenna, where the second signal generator is configured to: generate a second local-frequency signal, and send the second local-frequency signal to the combiner;

the second mixer is configured to receive a third downlink radio frequency signal having the first radio frequency band that is sent by the signal source;

the second mixer is further configured to: receive the second local-frequency signal sent by the second signal generator, perform frequency mixing processing on the third downlink radio frequency signal having the first radio frequency band by using the second local-frequency signal, to form a downlink radio frequency signal having a third radio frequency band, and then send the downlink radio frequency signal having the third radio frequency band to the combiner; or perform frequency mixing processing on the third downlink radio frequency signal having the first radio frequency band by using a local-frequency signal generated by the second mixer, to form a downlink radio frequency signal having a third radio frequency band, and then send the downlink radio frequency signal having the third radio frequency band to the combiner, where the third radio frequency band and the first radio frequency band do not overlap with each other;

the combiner is further configured to: receive the downlink radio frequency signal having the third radio frequency band that is sent by the second mixer and the second local-frequency signal sent by the second signal generator, combine the received downlink radio frequency signal having the third radio frequency band and the received second local-frequency signal into the combined downlink radio frequency signal, and send a downlink radio frequency signal obtained after combination to the divider;

the divider is further configured to: obtain the downlink radio frequency signal having the third radio frequency band and the second local-frequency signal, and then send the downlink radio frequency signal having the third radio frequency band and the second local-frequency signal to the second passive mixer;

the second passive mixer is configured to: perform frequency mixing processing on the downlink radio frequency signal having the third radio frequency band by using the second local-frequency signal, to form the third downlink radio frequency signal having the first radio frequency band, and then send the third downlink radio frequency signal having the first radio frequency band to the third antenna; and the third antenna is configured to transmit the received third downlink radio frequency signal having the first radio frequency band.

According to a second aspect, an example of the present disclosure provides a distributed antenna system DAS, including a near-end signal receiving device, a passive DAS line, and a far-end receiving device, where the near-end signal receiving device includes a signal destination, a first signal generator, and a first mixer, and the far-end receiving device includes a first passive mixer and a first antenna, where the first signal generator is configured to: generate a first local-frequency signal, and send the first local-frequency signal to the first passive mixer by using the passive DAS line;

the first antenna is configured to: receive a first uplink radio frequency signal having a first radio frequency band, and send the first uplink radio frequency signal having the first radio frequency band to the first passive mixer;

the first passive mixer is configured to: receive the first local-frequency signal, perform frequency mixing processing on the first uplink radio frequency signal having the first radio frequency band by using the received first local-frequency signal, to form an uplink radio frequency signal having a second radio frequency band, and then send the uplink radio frequency signal having the second radio frequency band to the first mixer by using the passive DAS line;

the first mixer is configured to receive the uplink radio frequency signal having the second radio frequency band; and the first mixer is further configured to: perform frequency mixing processing on the received uplink radio frequency signal having the second radio frequency band by using the first local-frequency signal generated by the first signal generator, to form the first uplink radio frequency signal having the first radio frequency band, and then send the first uplink radio frequency signal having the first radio frequency band to the signal destination; or perform frequency mixing processing on the received uplink radio frequency signal having the second radio frequency band by using a local-frequency signal generated by the first mixer, to form the first uplink radio frequency signal having the first radio frequency band, and then send the first uplink radio frequency signal having the first radio frequency band to the signal destination.

With reference to the second aspect, in a first implementation of the second aspect, the far-end receiving device further includes a second antenna and a first combiner, and the near-end signal receiving device further includes a second divider, where the second antenna is configured to: receive a second uplink radio frequency signal having the first radio frequency band, and send the second uplink radio frequency signal having the first radio frequency band to the first combiner;

the first passive mixer is specifically configured to send the uplink radio frequency signal having the second radio frequency band to the first combiner;

the first combiner is configured to: receive the second uplink radio frequency signal having the first radio frequency band that is sent by the second antenna and the uplink radio frequency signal having the second radio frequency band that is sent by the first passive mixer, perform combination processing on the second uplink radio frequency signal having the first radio frequency band and the uplink radio frequency signal having the second radio frequency band, to form a combined uplink radio frequency signal, and then send the combined uplink radio frequency signal to the second divider by using the passive DAS line, where the first radio frequency band and the second radio frequency band do not overlap with each other;

the second divider is configured to: receive the combined uplink radio frequency signal, separate the signals in the received combined uplink radio frequency signal, to obtain the second uplink radio frequency signal having the first radio frequency band, and then send the second uplink radio frequency signal having the first radio frequency band to the signal destination, and to obtain the uplink radio frequency signal having the second radio frequency band, and then send the uplink radio frequency signal having the second radio frequency band to the first mixer; and the first mixer is specifically configured to receive the uplink radio frequency signal having the second radio frequency band that is sent by the second divider.

With reference to the first implementation of the second aspect or the second implementation of the second aspect, in a second implementation of the second aspect, the near-end signal receiving device further includes a second signal generator, a second combiner, and a second mixer, and the far-end receiving device further includes a third antenna, a second passive mixer, and a first divider, where the second signal generator is configured to: generate a second local-frequency signal, and send the second local-frequency signal to the second combiner;

the first signal generator is specifically configured to send the first local-frequency signal to the second combiner;

the second combiner is configured to: receive the first local-frequency signal sent by the first signal generator and the second local-frequency signal sent by the second signal generator, and perform combination processing on the first local-frequency signal and the second local-frequency signal, to form a first combined signal, and then send the first combined signal to the first divider by using the passive DAS line;

the first divider is configured to: receive the first combined signal, separate the signals in the first combined signal, to obtain the first local-frequency signal, and then send the first local-frequency signal to the first passive mixer, and to obtain the second local-frequency signal, and then send the second local-frequency signal to the second passive mixer;

the first passive mixer is specifically configured to receive the first local-frequency signal sent by the first divider;

the third antenna is configured to: receive a third uplink radio frequency signal having the first radio frequency band, and send the third uplink radio frequency signal having the first radio frequency band to the second passive mixer;

the second passive mixer is configured to: receive the second local-frequency signal sent by the first divider and the third uplink radio frequency signal having the first radio frequency band that is sent by the third antenna, perform frequency mixing processing on the third uplink radio frequency signal having the first radio frequency band by using the second local-frequency signal, to form an uplink radio frequency signal having a third radio frequency band, and then send the uplink radio frequency signal having the third radio frequency band to the first combiner, where the third radio frequency band and the second radio frequency band do not overlap with each other;

the first combiner is further configured to: receive the uplink radio frequency signal having the third radio frequency band that is sent by the second passive mixer, combine the uplink radio frequency signal having the third radio frequency band into the combined uplink radio frequency signal, and send an uplink radio frequency signal obtained after combination to the second divider by using the passive DAS line;

the second divider is further configured to: obtain the uplink radio frequency signal having the third radio frequency band, and then send the uplink radio frequency signal having the third radio frequency band to the second mixer;

the second mixer is configured to receive the uplink radio frequency signal having the third radio frequency band that is sent by the second divider; and the second mixer is further configured to: perform frequency mixing processing on the uplink radio frequency signal having the third radio frequency band by using the second local-frequency signal generated by the second signal generator, to form the third uplink radio frequency signal having the first radio frequency band, and then send the third uplink radio frequency signal having the first radio frequency band to the signal destination; or perform frequency mixing processing on the uplink radio frequency signal having the third radio frequency band by using a local-frequency signal generated by the second mixer, to form the third uplink radio frequency signal having the first radio frequency band, and then send the third uplink radio frequency signal having the first radio frequency band to the signal destination.

According to a third aspect, an example of the present disclosure provides a signal transmission method, executed by a distributed antenna system DAS, where the DAS includes a near-end signal generation device, a passive DAS line, and a far-end transmission device, the near-end signal generation device includes a signal source and a first signal generator, and the far-end transmission device includes a first passive mixer and a first antenna, where the method includes:

generating, by the first signal generator, a first local-frequency signal, and sending the first local-frequency signal to the first passive mixer by using the passive DAS line;

receiving, by the first passive mixer, the first local-frequency signal, and a downlink radio frequency signal having a second radio frequency band;

performing, by the first passive mixer, frequency mixing processing on the received downlink radio frequency signal having the second radio frequency band by using the first local-frequency signal, to form the first downlink radio frequency signal having a first radio frequency band, and then sending the first downlink radio frequency signal having the first radio frequency band to the first antenna; and transmitting, by the first antenna, the received first downlink radio frequency signal having the first radio frequency band.

With reference to the third aspect, in a first implementation of the third aspect, the near-end signal generation device further includes a first mixer and a combiner, and the far-end transmission device further includes a divider, where the sending, by the first signal generator, the first local-frequency signal to the first passive mixer specifically includes:

sending, by the first signal generator, the first local-frequency signal to the combiner, and sending, by the combiner, the first local-frequency signal to the first passive mixer;

before the receiving, by the first passive mixer, a downlink radio frequency signal having a second radio frequency band, the method further includes:

receiving, by the first mixer, the first downlink radio frequency signal having the first radio frequency band that is sent by the signal source;

performing, by the first mixer, frequency mixing processing on the first downlink radio frequency signal by using the first local-frequency signal generated by the first signal generator, and sending, to the combiner, the downlink radio frequency signal having the second radio frequency band that is generated after frequency mixing; or performing frequency mixing processing on the first downlink radio frequency signal by using a local-frequency signal generated by the first mixer, and sending, to the combiner, the downlink radio frequency signal having the second radio frequency band that is generated after frequency mixing;

receiving, by the combiner, the downlink radio frequency signal having the second radio frequency band and the first local-frequency signal, combining the received downlink radio frequency signal having the second radio frequency band and the received first local-frequency signal, to form a combined downlink radio frequency signal, and then sending the combined downlink radio frequency signal to the divider by using the passive DAS line; and receiving, by the divider, the combined downlink radio frequency signal, separating the signals included in the received combined downlink radio frequency signal, to obtain the downlink radio frequency signal having the second radio frequency band and the first local-frequency signal, and then sending the downlink radio frequency signal having the second radio frequency band and the first local-frequency signal to the first passive mixer; and the receiving, by the first passive mixer, the first local-frequency signal, and a downlink radio frequency signal having a second radio frequency band specifically includes:

receiving, by the first passive mixer, the first local-frequency signal and the downlink radio frequency signal having the second radio frequency band that are sent by the divider.

With reference to the first implementation of the third aspect, in a second implementation of the third aspect, the far-end transmission device further includes a second antenna, and the method further includes:

receiving, by the combiner, a second downlink radio frequency signal having the first radio frequency band that is sent by the signal source, combining the second downlink radio frequency signal into the combined downlink radio frequency signal, and sending a downlink radio frequency signal obtained after combination to the divider;

obtaining, by the divider, the second downlink radio frequency signal having the first radio frequency band, and then sending the second downlink radio frequency signal having the first radio frequency band to the second antenna; and transmitting, by the second antenna, the received second downlink radio frequency signal having the first radio frequency band.

With reference to the first implementation of the third aspect or the second implementation of the third aspect, in a third implementation of the third aspect, the near-end signal generation device further includes a second signal generator and a second mixer, and the far-end transmission device further includes a second passive mixer and a third antenna, where the method further includes:

generating, by the second signal generator, a second local-frequency signal, and sending the second local-frequency signal to the combiner;

receiving, by the second mixer, a third downlink radio frequency signal having the first radio frequency band that is sent by the signal source;

receiving, by the second mixer, the second local-frequency signal sent by the second signal generator, performing frequency mixing processing on the third downlink radio frequency signal having the first radio frequency band by using the second local-frequency signal, to form a downlink radio frequency signal having a third radio frequency band, and then sending the downlink radio frequency signal having the third radio frequency band to the combiner; or performing frequency mixing processing on the third downlink radio frequency signal having the first radio frequency band by using a local-frequency signal generated by the second mixer, to form a downlink radio frequency signal having a third radio frequency band, and then sending the downlink radio frequency signal having the third radio frequency band to the combiner, where the third radio frequency band and the first radio frequency band do not overlap with each other;

receiving, by the combiner, the downlink radio frequency signal having the third radio frequency band that is sent by the second mixer and the second local-frequency signal sent by the second signal generator, combining the received downlink radio frequency signal having the third radio frequency band and the received second local-frequency signal into the combined downlink radio frequency signal, and sending a downlink radio frequency signal obtained after combination to the divider;

obtaining, by the divider, the downlink radio frequency signal having the third radio frequency band and the second local-frequency signal, and then sending the downlink radio frequency signal having the third radio frequency band and the second local-frequency signal to the second passive mixer;

performing, by the second passive mixer, frequency mixing processing on the downlink radio frequency signal having the third radio frequency band by using the second local-frequency signal, to form the third downlink radio frequency signal having the first radio frequency band, and then sending the third downlink radio frequency signal having the first radio frequency band to the third antenna; and transmitting, by the third antenna, the received third downlink radio frequency signal having the first radio frequency band.

According to a fourth aspect, an example of the present disclosure provides a signal transmission method, executed by a distributed antenna system DAS, where the DAS includes a near-end signal receiving device, a passive DAS line, and a far-end receiving device, the near-end signal receiving device includes a signal destination, a first signal generator, and a first mixer, and the far-end receiving device includes a first passive mixer and a first antenna, where the method includes:

generating, by the first signal generator, a first local-frequency signal, and sending the first local-frequency signal to the first passive mixer by using the passive DAS line;

receiving, by the first antenna, a first uplink radio frequency signal having a first radio frequency band, and sending the first uplink radio frequency signal having the first radio frequency band to the first passive mixer;

receiving, by the first passive mixer, the first local-frequency signal, performing frequency mixing processing on the first uplink radio frequency signal having the first radio frequency band by using the received first local-frequency signal, to form an uplink radio frequency signal having a second radio frequency band, and then sending the uplink radio frequency signal having the second radio frequency band to the first mixer by using the passive DAS line;

receiving, by the first mixer, the uplink radio frequency signal having the second radio frequency band; and performing, by the first mixer, frequency mixing processing on the received uplink radio frequency signal having the second radio frequency band by using the first local-frequency signal generated by the first signal generator, to form the first uplink radio frequency signal having the first radio frequency band, and then sending the first uplink radio frequency signal having the first radio frequency band to the signal destination; or performing frequency mixing processing on the received uplink radio frequency signal having the second radio frequency band by using a local-frequency signal generated by the first mixer, to form the first uplink radio frequency signal having the first radio frequency band, and then sending the first uplink radio frequency signal having the first radio frequency band to the signal destination.

With reference to the fourth aspect, in a first implementation of the fourth aspect, the far-end receiving device further includes a second antenna and a first combiner, and the near-end signal receiving device further includes a second divider, where the sending, by the first passive mixer, the uplink radio frequency signal having the second radio frequency band to the first mixer specifically includes:

sending, by the first passive mixer, the uplink radio frequency signal having the second radio frequency band to the first combiner;

the method further includes:

receiving, by the second antenna, a second uplink radio frequency signal having the first radio frequency band, and sending the second uplink radio frequency signal having the first radio frequency band to the first combiner;

receiving, by the first combiner, the second uplink radio frequency signal having the first radio frequency band that is sent by the second antenna and the uplink radio frequency signal having the second radio frequency band that is sent by the first passive mixer, performing combination processing on the second uplink radio frequency signal having the first radio frequency band and the uplink radio frequency signal having the second radio frequency band, to form a combined uplink radio frequency signal, and then sending the combined uplink radio frequency signal to the second divider by using the passive DAS line, where the first radio frequency band and the second radio frequency band do not overlap with each other; and receiving, by the second divider, the combined uplink radio frequency signal, separating the signals in the received combined uplink radio frequency signal, to obtain the second uplink radio frequency signal having the first radio frequency band, and then sending the second uplink radio frequency signal having the first radio frequency band to the signal destination, and to obtain the uplink radio frequency signal having the second radio frequency band, and then sending the uplink radio frequency signal having the second radio frequency band to the first mixer; and the receiving, by the first mixer, the uplink radio frequency signal having the second radio frequency band specifically includes:

receiving, by the first mixer, the uplink radio frequency signal having the second radio frequency band that is sent by the second divider.

With reference to the first implementation of the fourth aspect or the second implementation of the fourth aspect, in a second implementation of the fourth aspect, the near-end signal receiving device further includes a second signal generator, a second combiner, and a second mixer, and the far-end receiving device further includes a third antenna, a second passive mixer, and a first divider, where the sending, by the first signal generator, the first local-frequency signal specifically includes:

sending, by the first signal generator, the first local-frequency signal to the second combiner; and the method further includes:

generating, by the second signal generator, a second local-frequency signal, and sending the second local-frequency signal to the second combiner;

receiving, by the second combiner, the first local-frequency signal sent by the first signal generator and the second local-frequency signal sent by the second signal generator, and performing combination processing on the first local-frequency signal and the second local-frequency signal, to form a first combined signal, and then sending the first combined signal to the first divider by using the passive DAS line;

receiving, by the first divider, the first combined signal, separating the signals in the first combined signal, to obtain the first local-frequency signal, and then sending the first local-frequency signal to the first passive mixer, and to obtain the second local-frequency signal, and then sending the second local-frequency signal to the second passive mixer;

receiving, by the third antenna, a third uplink radio frequency signal having the first radio frequency band, and sending the third uplink radio frequency signal having the first radio frequency band to the second passive mixer;

receiving, by the second passive mixer, the second local-frequency signal sent by the first divider and the third uplink radio frequency signal having the first radio frequency band that is sent by the third antenna, performing frequency mixing processing on the third uplink radio frequency signal having the first radio frequency band by using the second local-frequency signal, to form an uplink radio frequency signal having a third radio frequency band, and then sending the uplink radio frequency signal having the third radio frequency band to the first combiner, where the third radio frequency band and the second radio frequency band do not overlap with each other;

receiving, by the first combiner, the uplink radio frequency signal having the third radio frequency band that is sent by the second passive mixer, combining the uplink radio frequency signal having the third radio frequency band into the combined uplink radio frequency signal, and sending an uplink radio frequency signal obtained after combination to the second divider by using the passive DAS line;

obtaining, by the second divider, the uplink radio frequency signal having the third radio frequency band, and then sending the uplink radio frequency signal having the third radio frequency band to the second mixer;

receiving, by the second mixer, the uplink radio frequency signal having the third radio frequency band that is sent by the second divider; and performing, by the second mixer, frequency mixing processing on the uplink radio frequency signal having the third radio frequency band by using the second local-frequency signal generated by the second signal generator, to form the third uplink radio frequency signal having the first radio frequency band, and then sending the third uplink radio frequency signal having the first radio frequency band to the signal destination; or performing frequency mixing processing on the uplink radio frequency signal having the third radio frequency band by using a local-frequency signal generated by the second mixer, to form the third uplink radio frequency signal having the first radio frequency band, and then sending the third uplink radio frequency signal having the first radio frequency band to the signal destination.

It can be known from above that, the examples of the present disclosure provide a distributed antenna system and a signal transmission method. The distributed antenna system includes a near-end signal generation device, a passive DAS line, and a far-end transmission device. The near-end signal generation device includes a first signal generator. The far-end transmission device includes a first passive mixer and a first antenna. The passive mixer at a far end is used to process a received radio frequency signal. Compared with other DAS systems, a passive mixer is provided on a far-end transmission device, and frequency mixing processing is performed by using a local-frequency signal transferred to the passive mixer by another device. That is, the passive mixer does not need to generate a local-frequency signal and does not need power to be supplied to the passive mixer, thereby avoiding the problems of high construction difficulty and high costs resulted from a solution in which power is supplied to an active mixer at a far end in a DAS.

In the several examples provided in this application, it should be understood that the disclosed system, device, and method may be implemented in other manners. For example, the described device example is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate devices may or may not be physically separate, and devices displayed as units may or may not be physical units, may be located in one position, or may be distributed on a plurality of network units. Some or all of the units may be selected according to actual needs to achieve the objectives of the solutions of the examples.

In addition, functional units in the examples of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit,"

or "sub-unit" may include memory (shared, dedicated, or group) that stores code or instructions that can be executed by one or more processors.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the examples of the present disclosure. The foregoing storage medium includes: any medium that can store program code, such as a USB flash drive, a removable hard disk, a read-only memory (ROM), a random access memory (RAM), a magnetic disk, or an optical disc.

A person of ordinary skill in the art may understand that all or a part of the steps of the methods in the examples may be implemented by a program instructing relevant hardware. The program may be stored in a computer readable storage medium. The storage medium may include: a read-only memory, a random-access memory, a magnetic disk, or an optical disc.

Finally, it should be noted that the foregoing examples are merely intended for describing the technical solutions of the present disclosure, but not for limiting the present disclosure. Although the present disclosure is described in detail with reference to the foregoing examples, persons of ordinary skill in the art should understand that they may still make modifications to the technical solutions described in the foregoing examples or make equivalent replacements to some technical features thereof, without departing from the scope of the technical solutions of the examples of the present disclosure.

What is claimed is:

1. A distributed antenna system (DAS), comprising:
   a near-end signal generation device, wherein the near-end signal generation device comprises a signal source, a first mixer, a first signal generator, and a combiner;
   a far-end transmission device, wherein the far-end transmission device comprises a divider, a first passive mixer, a first antenna and a second antenna; and
   a DAS line connecting the near-end signal generation device to the far-end transmission device;
   wherein the signal source is configured to provide a first signal S2 to the first mixer and a second signal S1 to the combiner, wherein the first signal S2 is a first downlink radio frequency signal having a first radio frequency band, and wherein the second signal S1 is a second downlink radio frequency signal having the first radio frequency band;
   wherein the first mixer is configured to:
      perform frequency mixing processing on the first signal S2 to obtain a third signal S3, wherein the third signal S3 is a downlink radio frequency signal having a second radio frequency band, and
      provide the third signal S3 to the combiner;
   wherein the first signal generator is configured to generate a first local-frequency signal and provide the first local-frequency signal to the combiner;
   wherein the combiner is configured to combine the third signal S3, the first local-frequency signal, and the second signal S1 to obtain a combined signal;
   wherein the DAS line is configured to carry the combined signal from the near-end signal generation device to the far-end transmission device;
   wherein the divider is configured to:
      receive the combined signal,
      separate the combined signal into the second signal S1, the third signal S3, and the first local-frequency signal,
      provide the second signal S1 to the second antenna, and
      provide the third signal S3 and the first local-frequency signal to the first passive mixer;
   wherein the first passive mixer is configured to:
      perform frequency mixing processing on the third signal S3 by using the first local-frequency signal to obtain the first signal S2, and
      provide the first signal S2 to the first antenna;
   wherein the first antenna is configured to transmit the first signal S2; and
   wherein the second antenna is configured to transmit the second signal S1.

2. A distributed antenna system (DAS), comprising
   a near-end signal receiving device, wherein the near-end signal receiving device comprises a signal destination, a first mixer, and a second divider;
   a far-end receiving device, wherein the far-end receiving device comprises a first antenna, a second antenna, a first passive mixer and a first combiner; and
   a DAS line connecting the far-end receiving device to the near-end signal receiving device;
   wherein the first antenna is configured to receive a first signal S1, wherein the first signal S1 is a first uplink radio frequency signal having a first radio frequency band, and provide the first signal S1 to the first passive mixer;
   wherein the first passive mixer is configured to perform frequency mixing processing on the first signal S1 by using a first local-frequency signal to obtain a third signal S3, wherein the third signal S3 is an uplink radio frequency signal having a second radio frequency band, and provide the third signal S3 to the first combiner;
   wherein the second antenna is configured to receive a second signal S2, wherein the second signal S2 is a second uplink radio frequency signal having the first radio frequency band, and provide the second signal S2 to the first combiner;
   wherein the first combiner is configured to combine the second signal S2 and the third signal S3 to obtain a combined signal;
   wherein the DAS line is configured to carry the combined signal from the first combiner to the second divider;
   wherein the second divider is configured to:
      receive the combined signal,
      separate the combined signal into the second signal S2 and the third signal S3,
      provide the second signal S2 to the signal destination, and
      provide the third signal S3 to the first mixer; and
   wherein the first mixer is configured to:
      perform frequency mixing processing on the third signal S3 to obtain the first signal S1, and
      provide the first signal S1 to the signal destination.

3. The DAS of claim 2, wherein the first mixer is configured to perform frequency mixing processing by using the first local-frequency signal.

4. The DAS of claim 2, wherein the first mixer is configured to generate a local-frequency signal and to use the generated local-frequency signal to perform frequency mixing processing.

5. A signal transmission method, comprising:
   providing, by a signal source of a near-end signal generation device in a distributed antenna system (DAS), a first signal S2 to a first mixer of the near-end signal generation device and a second signal S1 to a combiner of the near-end signal generation device, wherein the first signal S2 is a first downlink radio frequency signal having a first radio frequency band, and wherein the second signal S1 is a second downlink radio frequency signal having the first radio frequency band;

performing, by the first mixer, frequency mixing processing on the first signal S2 to obtain a third signal S3, wherein the third signal S3 is a downlink radio frequency signal having a second radio frequency band;

providing, by the first mixer, the third signal S3 to the combiner;

generating, by a first signal generator of the near-end signal generation device, a first local-frequency signal;

providing, by the first signal generator, the first local-frequency signal to the combiner;

combining, by the combiner, the third signal S3, the first local-frequency signal, and the second signal S1 to obtain a combined signal;

sending the combined signal to a divider of a far-end transmission device in the DAS via a DAS line of the DAS;

separating, by the divider, the combined signal into the second signal S1, the third signal S3, and the first local-frequency signal;

providing, by the divider, the second signal S1 to a second antenna of the far-end transmission device;

providing, by the divider, the third signal S3 and the first local-frequency signal to a first passive mixer of the far-end transmission device;

performing, by the first passive mixer, frequency mixing processing on the third signal S3 by using the first local-frequency signal to obtain the first signal S2;

providing, by the first passive mixer, the first signal S2 to a first antenna of the far-end transmission device;

transmitting, by the first antenna, the first signal S2; and transmitting, by the second antenna, the second signal S1.

\* \* \* \* \*